US012623747B2

(12) United States Patent (10) Patent No.: US 12,623,747 B2

Vermeulen (45) Date of Patent: May 12, 2026

(54) SYSTEMS AND METHODS FOR FOLDING AND PACKING A HUMAN POWERABLE VEHICLE

(71) Applicant: Bert Vermeulen, Cheyenne, WY (US)

(72) Inventor: Bert Vermeulen, Cheyenne, WY (US)

( * ) Notice: Subject to any disclaimer, the term of this patent is extended or adjusted under 35 U.S.C. 154(b) by 372 days.

(21) Appl. No.: 18/220,253

(22) Filed: Jul. 10, 2023

(65) Prior Publication Data

US 2024/0010293 A1 Jan. 11, 2024

Related U.S. Application Data

(60) Provisional application No. 63/359,864, filed on Jul. 10, 2022.

(51) Int. Cl.
*B62K 15/00* (2006.01)
*B62K 19/02* (2006.01)

(52) U.S. Cl.
CPC ............ *B62K 15/008* (2013.01); *B62K 19/02* (2013.01)

(58) Field of Classification Search
CPC .... B62K 15/008; B62K 19/02; B62K 15/006; B62K 15/00
See application file for complete search history.

(56) References Cited

U.S. PATENT DOCUMENTS

| | | | | |
|---|---|---|---|---|
| 4,182,522 A | * | 1/1980 | Ritchie ................. | B62K 15/008 280/278 |
| 4,579,360 A | * | 4/1986 | Nishimura ........... | B62K 15/006 280/278 |
| 4,830,133 A | * | 5/1989 | Gaddi .................. | B62K 15/008 280/278 |
| 6,364,335 B1 | * | 4/2002 | Mombelli ............ | B62K 15/008 280/278 |
| 6,623,023 B2 | * | 9/2003 | Niitsu .................. | B62K 15/008 280/278 |
| 6,854,551 B2 | * | 2/2005 | Wisecarver .......... | B62D 31/006 280/43 |
| 7,651,109 B2 | * | 1/2010 | Tong .................... | B62K 15/008 280/278 |
| 8,328,219 B2 | * | 12/2012 | Laxstrom ............. | B62K 15/008 280/279 |
| 9,457,864 B2 | * | 10/2016 | Bailie .................. | B62K 15/008 |
| 10,392,072 B2 | * | 8/2019 | Vermeulen ........... | B62K 15/006 |
| 11,235,833 B2 | * | 2/2022 | Boutakis ............... | B62K 21/24 |
| 12,077,239 B2 | * | 9/2024 | Wang ................... | B62K 15/008 |
| 2002/0139217 A1 | * | 10/2002 | Montague ............. | B62K 21/16 74/493 |
| 2007/0205577 A1 | * | 9/2007 | Lau ...................... | B62K 15/008 280/278 |

(Continued)

*Primary Examiner* — Valentin Neacsu
*Assistant Examiner* — Michael R Stabley

(57) ABSTRACT

A bicycle folding system comprises a front fork with a first steerer for rotating the front fork in a head tube, a second steerer that rotatably attaches to a crown of the front fork, and a clamp module that secures the first steerer in the head tube. The clamp module also detachably attaches to the second steerer, which (a) secures the second steerer in front of and substantially parallel to the first steerer when the bicycle is in a rideable configuration, and (b) detaches to allow rotation of the second steerer when folding the bike. The axis of rotation of the second steerer for the bike folding process is perpendicular to the axis of rotation of the first steerer in the front fork.

20 Claims, 18 Drawing Sheets

(56)               References Cited

U.S. PATENT DOCUMENTS

| | | | | |
|---|---|---|---|---|
| 2012/0024102 A1* | 2/2012 | Marion | .................. | B62K 21/24 |
| | | | | 74/493 |
| 2019/0291807 A1* | 9/2019 | Sotir | ...................... | B62K 21/22 |
| 2020/0391817 A1* | 12/2020 | Boutakis | ................ | B62K 21/24 |
| 2023/0159131 A1* | 5/2023 | Wang | .................. | B62K 15/008 |
| | | | | 280/639 |

* cited by examiner

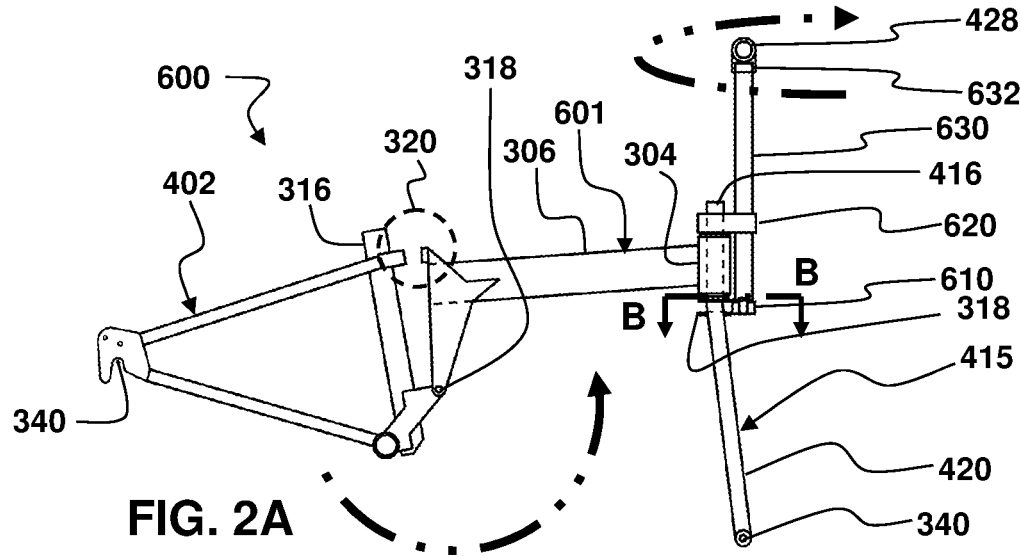
FIG. 2A
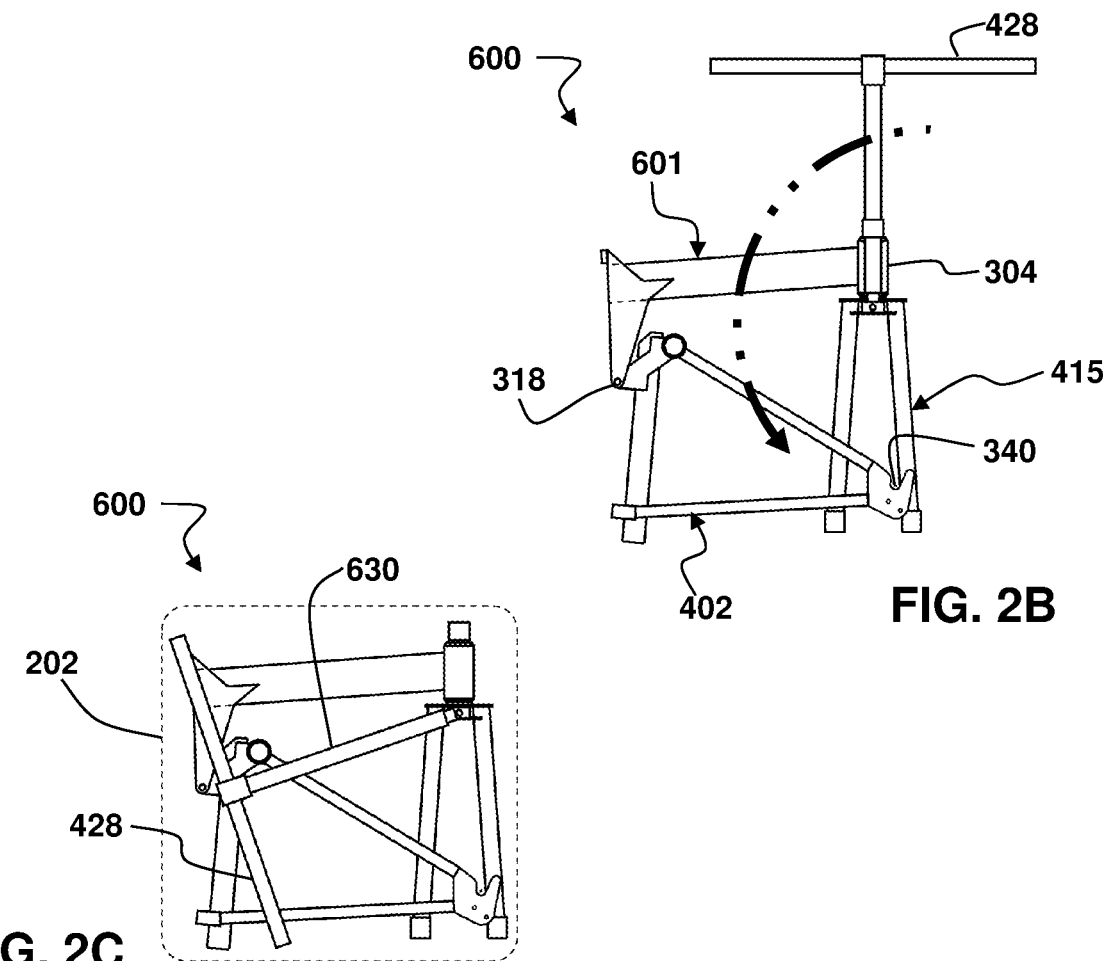
FIG. 2B
FIG. 2C

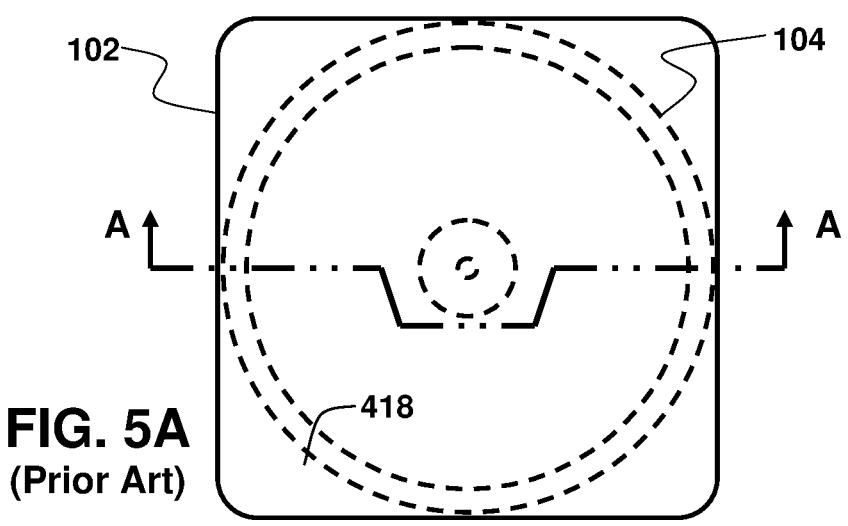
FIG. 5A
(Prior Art)
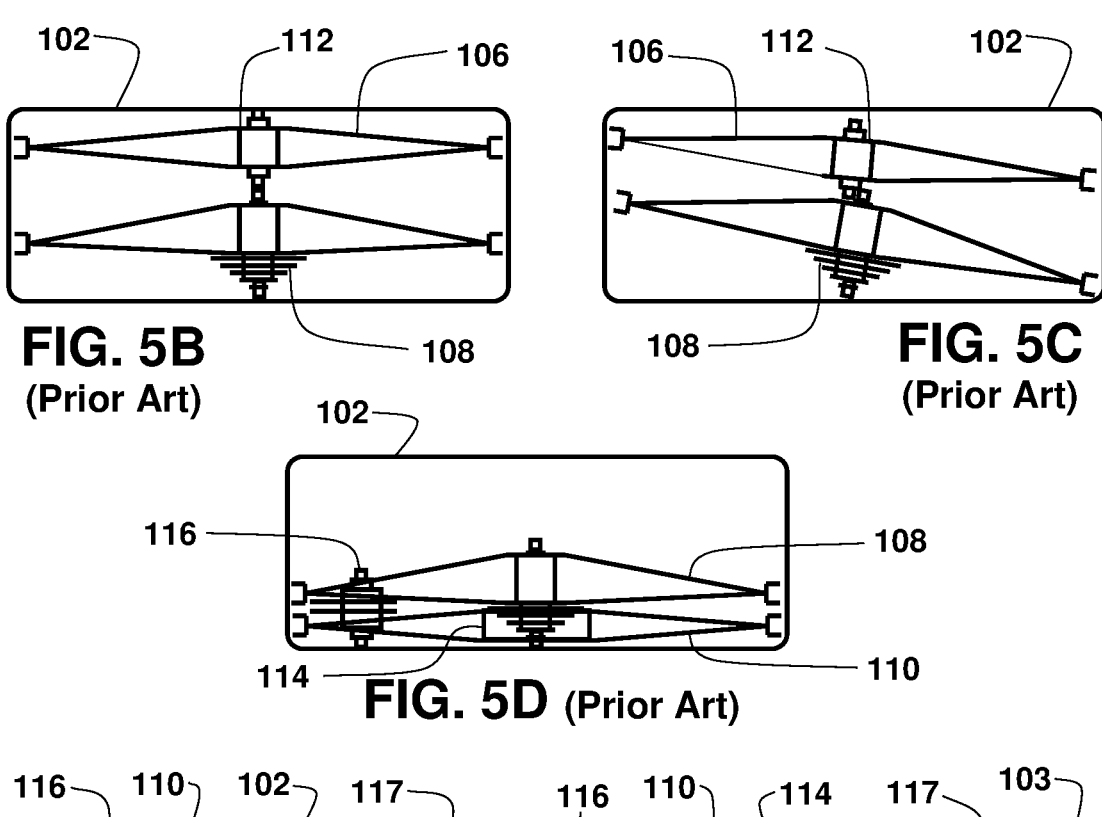
FIG. 5B
(Prior Art)
FIG. 5C
(Prior Art)
FIG. 5D (Prior Art)
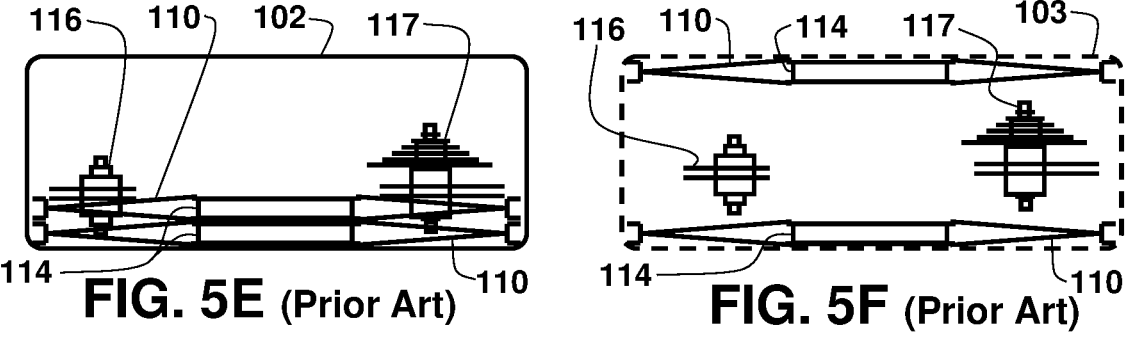
FIG. 5E (Prior Art)
FIG. 5F (Prior Art)

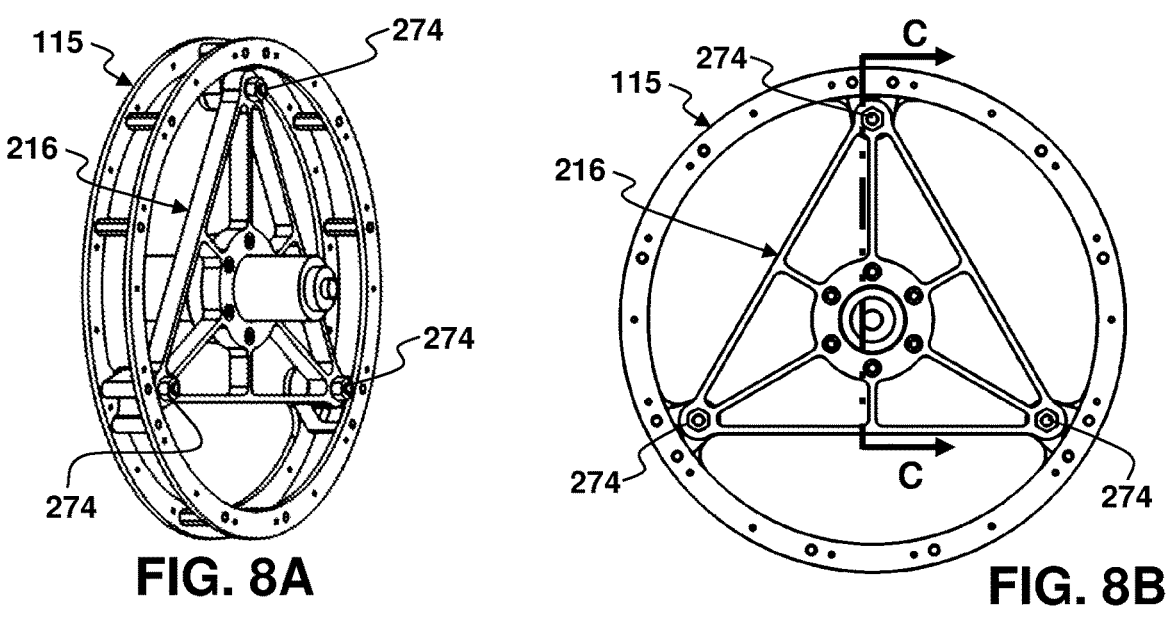
FIG. 8A
FIG. 8B
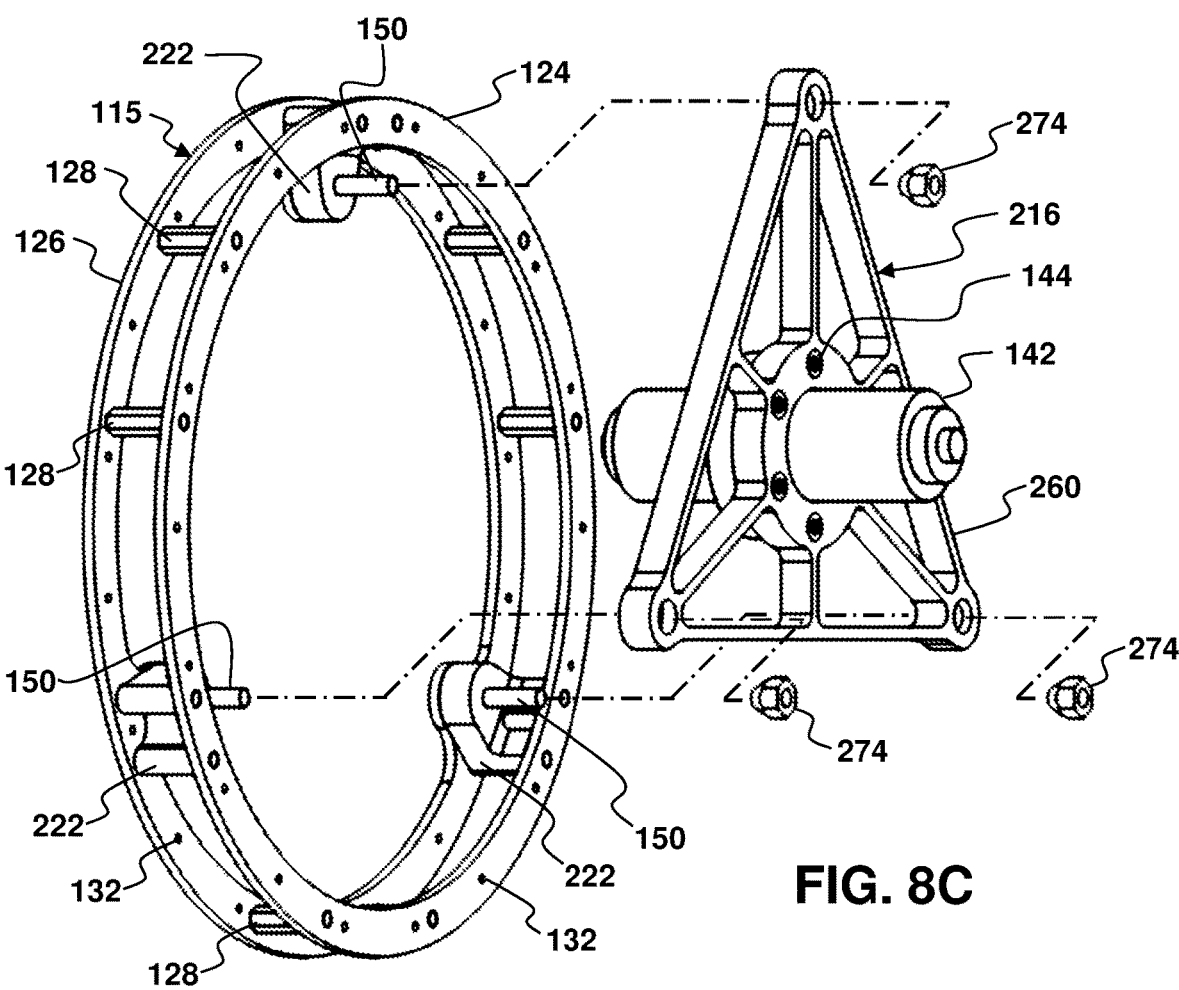
FIG. 8C

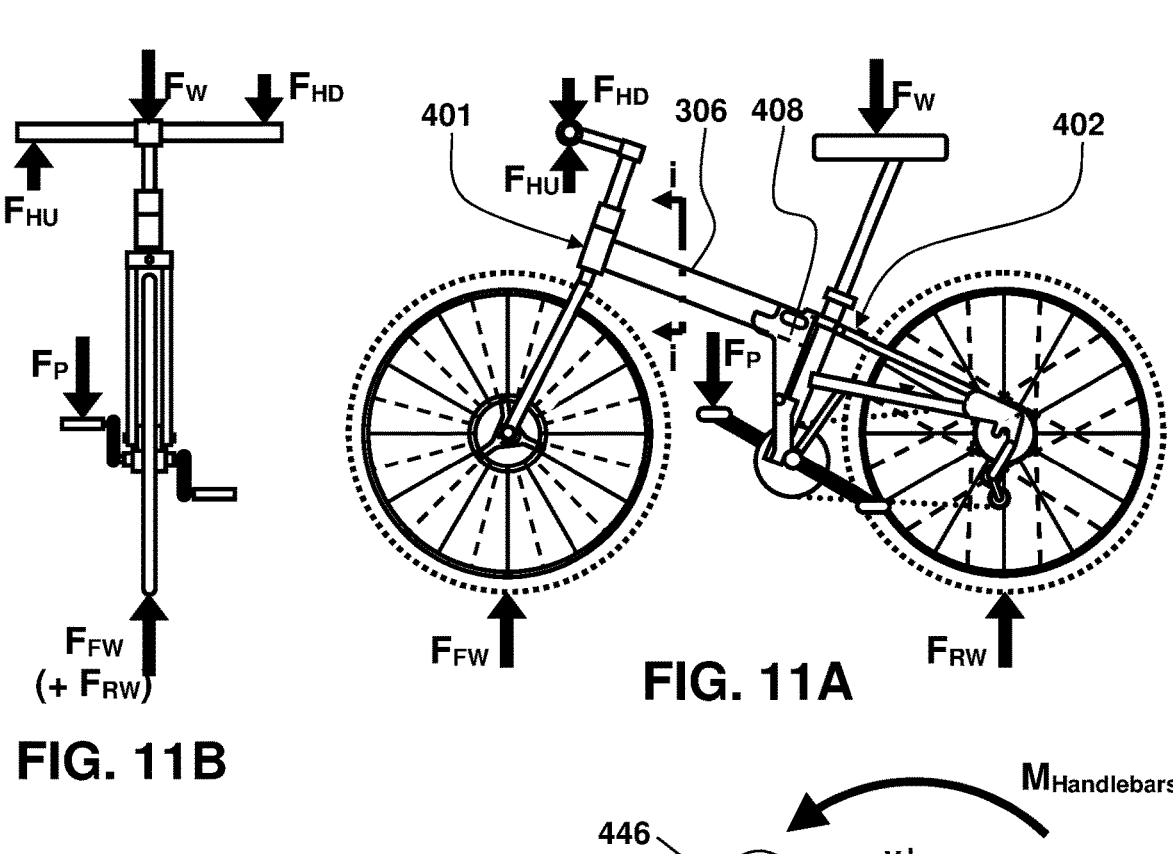
FIG. 11A
FIG. 11B
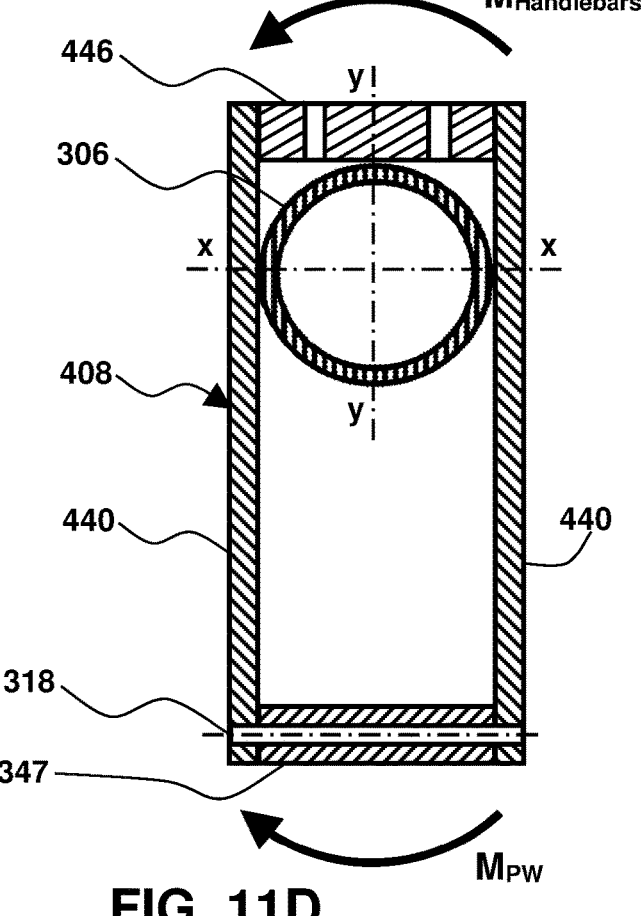
FIG. 11C
FIG. 11D

SYSTEMS AND METHODS FOR FOLDING AND PACKING A HUMAN POWERABLE VEHICLE

This application claims benefit of U.S. Provisional Application Ser. No. 63/359,864 filed 10 Jul. 2022, the entire contents of which are incorporated by reference herein.

FIELD OF INVENTION

This document relates to systems and methods for improving the ability to pack a human-powerable wheeled vehicle when not ridden, and to unpack it for riding. Human-powerable wheeled vehicles can include unicycles, bicycles, tricycles, quadricycles, wheelchairs, strollers, push scooters, and powered versions of such vehicles (such as e-bikes) that use human power and other power sources, such as electric motors or gasoline engines.

BACKGROUND

It is beneficial for bikes, or similar, to be packed compactly, protected from impact, and covered when stored or transported by car, transit (buses, trains, etc.), planes, boats, etc. The packed bike might be carried or rolled short distances at a station or airport. Packed human-powerable vehicles can be stored and locked more easily than when "ready to ride." To minimize weight, human-powerable vehicles typically use space frame structures for strength and stiffness, but space frames and bike wheels occupy a large physical volume, which is undesirable for storage and transport.

Bike transport on commercial aircraft is an example. Many airlines charge for each piece of checked luggage. They charge more for oversize items (often specified as length+width+height greater than 62 linear inches) and/or overweight items (typically more than 50 pounds). Airlines might refuse to take luggage if not properly packed and are often not responsible for damage during transit. Observation of how luggage is handled shows that a packed bike must sustain impacts from all directions and angles. Luggage must be openable and searchable by airport security personnel and must be easily repacked after inspection.

Some bicycles with small wheels use ingenious folding to convert from a packed to a ridable bike quickly, cleanly, and without tools. Some small wheel bikes fold compactly enough to fit within the 62-linear inch size requirement and 50-pound weight limit. It is much easier to fit into 62 linear inches when the wheel is less than one third of the total length+width+height, i.e. when the nominal outside diameter of the tire is 20 inches or less.

Folding bike embodiments with small wheels and tires (20 inch or less) generally don't perform as well on a variety of road surfaces and terrains as bicycles with normal full-size wheels. In this document and related claims, full-size wheels are defined as wheels with a nominal outside tire diameter of 24 inches or greater and small wheels have tires nominally 20 inches in diameter or smaller. Here is a list of common small and full wheel and tire sizes:

| Common name (nominal outside diameter of tire) | Outside diameter of rim | Bead seat diameter (inside diameter of tire) |
|---|---|---|
| 700C/29 inch | 648 mm (25.5 inches) | 622 mm (24.5 inches) |
| 650B/27.5 inch | 610 mm (24 inches) | 584 mm (23 inches) |

-continued

| Common name (nominal outside diameter of tire) | Outside diameter of rim | Bead seat diameter (inside diameter of tire) |
|---|---|---|
| 26 inch | 585 mm (23 inches) | 559 mm (22 inches) |
| 24 inch | 533 mm (21 inches) | 507 mm (20 inches) |
| 20 inch | 477 mm (19 inches) | 451 mm (18 inches) |
| 20 inch | 432 mm (17.75 inches) | 406 mm (16.25 inches) |
| 16 inch | 375 mm (14.75 inches) | 349 mm (13.75 inches) |

Prior art full-size wheeled bikes that pack into the 62 linear inches typically require much time, tools, expertise, and finesse to disassemble, pack, and reassemble. Referring to the bike wheel sizes listed, a typical road bike uses 700C wheels, with an outside tire diameter of 27 to 29 inches and an outside rim diameter of about 25.5 inches. The typical target packed size for such bikes is 26×26×10 inches. It takes removing the air from the tires, many disassembly steps, detailed instructions, tools, covers to wrap each part, and patience to pack all the parts into these dimensions and prevent damage during transport.

One challenge with fitting a bike with full-size wheels into 62 linear inches is that the wheels are large in diameter and fat in the center due to the tension spokes in a triangular configuration, when viewed in cross section, or a dual conical configuration when viewed three dimensionally. The spokes typically terminate in a set of holes in one plane in the rim and terminate in two parallel planes in a circular configuration in the hub. In a cross-section view, this looks like a triangle that is wide at the hub and narrow at the rim. When two wheels with such centers are put into a 26×26×10 inch case, there is little room for anything else. Saving space by compactly storing the wheels can simplify packing the other bicycle parts. It is known to have wheels that disassemble to save space, but disassemble-able wheels typically do not use tension spokes in a triangular/conical configuration. Wheels with triangular/conical spokes in tension are desired because this space frame configuration has a high strength to weight ratio. Weight is paramount for a human-powerable vehicle.

Bike technology and components continue to improve. For example, disk brakes are replacing rim brakes on many bikes. Disk brakes present their own challenges when trying to compactly pack a bicycle without damage. They also present opportunities, because the space formerly used for rim brake calipers can be beneficially used for other purposes.

Many bicycles that are transported as checked luggage require an uncollapsible structural case, which can add to total luggage weight. There is also the issue of what to do with the case when one arrives at a destination and wants to start riding. It is better if the bike is packable in a compact arrangement that needs minimal or no external transport container or uses a transport container that can be converted to a usable part of a rideable bike.

In summary, the goal is a system/method for packing a human-powerable vehicle that (a) fits the vehicle/bike in one piece of luggage that meets applicable size and weight restrictions, (b) performs well when ridden, (c) is quick to pack/unpack; (d) is light weight; and (d) requires minimal tools and packaging for transporting when packed. (e) Ideally, such a system/method would not need a separate uncompactable suitcase. (f) The system/method should be as cost effective and simple to manufacture. It should be (g) safe, (h) reliable, and (i) ensure that nothing is damaged during shipment.

BRIEF DESCRIPTION OF THE DRAWINGS

This disclosure is described in conjunction with the appended figures in which:

FIG. 2A shows a folding frame for the improved folding bicycle of FIG. 1B;

FIG. 2B shows the folding frame of FIG. 2A with a rear frame section rotated approximately 180 degrees counterclockwise relative to a front frame section about a pivot point that is forward and above the axis of rotation of the cranks when the bicycle is in a rideable configuration and the front fork and handlebars rotated 90 degrees about the axis of the head tube;

FIG. 2C shows the configuration of FIG. 2B with the handlebars and a steerer tube extender rotated approximately 120 degrees counterclockwise about a pivot point in front of the head tube and proximate to the fork crown, with the resulting folded frame placed into 24×24 inch container;

FIG. 5A shows an axial view of two spoked 700C bicycle wheels in a 26×26×10 inch container;

FIG. 5B shows section A-A of FIG. 5A for two prior art spoked 700C bicycle wheels;

FIG. 5C shows section A-A of FIG. 5A for two prior art spoked 700C bicycle wheels when the wheels are angled slightly to reduce total stack height;

FIG. 5D shows section A-A of FIG. 5A when the prior art spoked 700C front wheel has been replaced with a spoked wheel incorporating a central annulus with an aperture that allows the axle of the rear wheel to nest inside the aperture;

FIG. 5E shows section A-A of FIG. 5A when the prior art spoked 700C front wheel and the prior art spoked 700C rear wheel have both been replaced with spoked wheels incorporating central annuli and removable hubs and both wheels are placed adjacent to one another in a 26×26×10 inch container;

FIG. 5F shows section A-A of FIG. 5A when the prior art spoked 700C front wheel and the prior art spoked 700C rear wheel have both been replaced with spoked wheels incorporating central annuli and removable hubs and both wheels are placed on opposite sides of a 26×26×10 inch physical volume;

FIG. 8A shows a perspective view of a wheel embodiment comprising a central annulus, a user detachable hub, and three conical attachment elements in the form of lug nuts to attach the annulus to the hub;

FIG. 8B shows an end view of the assembly of FIG. 8A;

FIG. 8C shows an exploded view of the assembly of FIG. 8A;

FIG. 11A shows examples of some of the forces on a typical bicycle, such as the bicycle shown in FIG. 1A;

FIG. 11B shows a front view of the bicycle of FIG. 11A;

FIG. 11C shows section i-i of FIG. 11B to illustrate the torsional forces on the front section of a bicycle frame when a rider is standing on the pedals;

FIG. 11D shows a forward-looking view of the connection module between the front frame section and the rear frame section (view J-J in FIG. 12A);

Figure 1A:
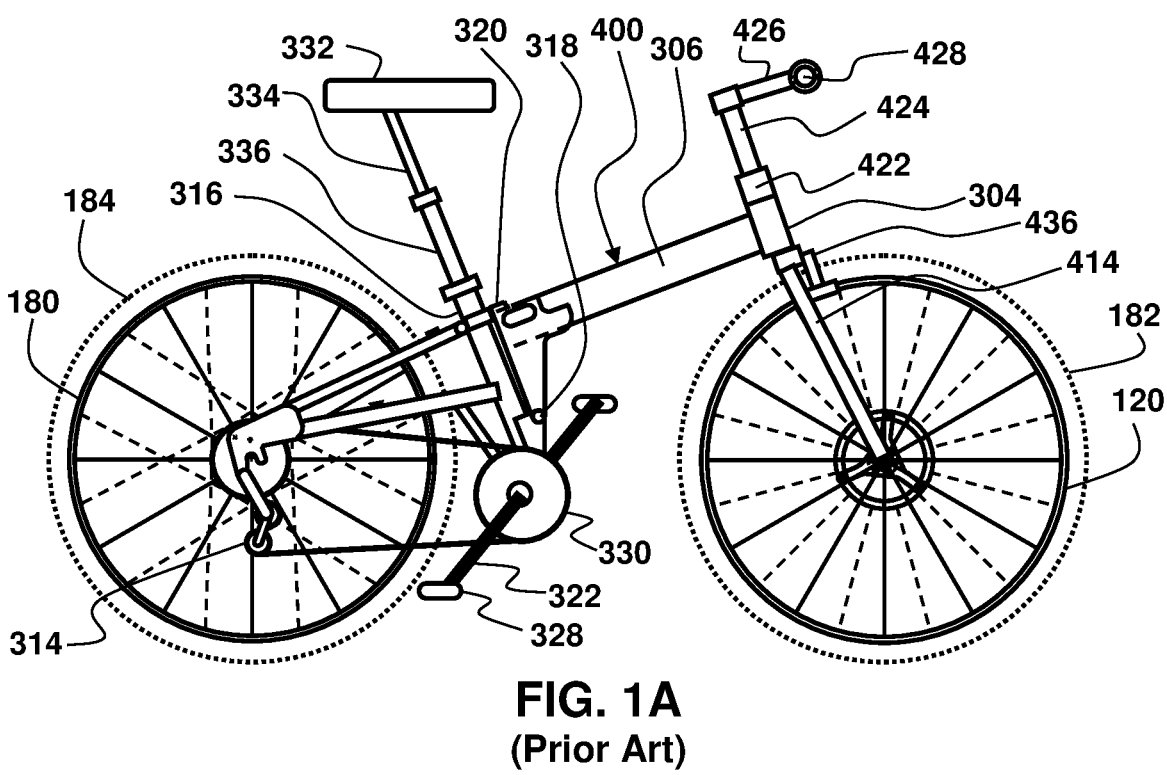
FIG. 1A shows a prior art folding bicycle.

It should be understood that the drawings are not necessarily to scale. In certain instances, details that are not necessary for an understanding of the invention or that render other details difficult to perceive may have been omitted. It should be understood that the invention is not necessarily limited to the particular embodiments illustrated herein.

DETAILED DESCRIPTION

The ensuing description provides preferred exemplary embodiment(s) only, and is not intended to limit the scope, applicability or configuration of the disclosure. Rather, the ensuing description of the preferred exemplary embodiment (s) will provide those skilled in the art with an enabling description for implementing a preferred exemplary embodiment. It should be understood that various changes could be made in the function and arrangement of elements without departing from the spirit and scope as set forth in the appended claims.

Specific details are given in the following description to provide a thorough understanding of the embodiments. However, it will be understood by one of ordinary skill in the art that the embodiments may be practiced without these specific details. For example, those skilled in the art will know that different materials, manufacturing processes, fastening systems, configurational arrangements, and components may be substituted.

1. Definitions

In one embodiment, the system and/or method is for a wheeled human-powerable vehicle. For purposes of this document and the appended claims, a wheeled human-powerable vehicle is defined as any vehicle having wheels that is configured for a human to add or exclusively provide locomotive power. Examples include bicycles, motor-assisted bicycles (such as mopeds, e-bikes, etc.), wheelchairs, tricycles, unicycles, quadricycles, tandems, push scooters, etc.

In this disclosure and the appended claims, the term bicycle (or bike) is used to describe a human powerable vehicle having two main wheels that is configured to transport a human. The term bicycle includes tandems, recumbents, bicycles with training wheels, and any other combination of a plurality (at least two) wheels, with any attachment between them, or no other components or attachment between them. Thus, a bicycle also comprises any pair of wheels, with or without any other components.

In one embodiment, the system and/or method being documented comprise a foldable human-powerable vehicle. A foldable human-powerable vehicle can be any human power-able vehicle comprising a frame that comprises at least two sections and a hinge or connected pivot point wherein a first frame section can be rotated about the pivot point or hinge relative to a second frame section and secured when the human powerable vehicle is configured for transporting a human. The folding human-powerable vehicle can be of any other shape or configuration using any other components capable of being understood by anyone skilled in the art.

In one embodiment, the system and/or method being documented can comprise an annulus, annular module, or ring-shaped module. For purposes of this disclosure and the appended claims, an annulus (or annular module) shall include any ring-shaped structure having a central region in the form of opening or aperture that facilitates the nesting of components partially or completely inside of one another. An annulus can be monolithic. An annulus can be assembled from multiple components. An annulus can be substantially flat with all features lying in one flat plane having a thickness many times smaller than the outside diameter of the annulus. An annulus can be thick in its axial direction. An annulus can be composed of elements that create attachment points that are planar (or co-planar) without the annulus necessarily occupying all spaces in the volume or plane connecting those points. An annulus can be cup-shaped with one side that is not open or only partially open. An annulus can have a completely open center throughout its entire shape.

In one embodiment, the system and/or method being documented comprise an annular wheel. A wheel can be any circular component that is intended to rotate about a central axis. A wheel can comprise a bearing. For purposes of this disclosure and the appended claims, a wheel does not necessarily need to have a bearing or central hub. A wheel can also be a circular component to which an axle, a bearing, or a hub is to be attached. Thus, a wheel can be annular, with a central opening or aperture that facilitates the nesting of components partially or completely inside of one another. A wheel can be monolithic. A wheel can be assembled from multiple components. A wheel can use spokes. The spokes can be in tension. A wheel can be of any other shape or configuration using any other components capable of being understood by anyone skilled in the art.

2. Comparison of Prior Art With Embodiments Disclosed Herein

Prior art bicycles designed for compact storage and transport generally fall into the following non-exclusive categories:

GROUP A comprises bicycles such as the embodiments shown in U.S. Pat. No. 4,426,606 (Hon) and U.S. Pat. No. 5,975,551 (Montague) that (1) have a single fold about a substantially vertical axis at a point located forward of the seat tube (Hon) or proximate to the seat tube (Montague), (2) do not remove the rear wheel when folding, and (3) have a folded size in at least one direction that is larger than diameter the of the wheels and typically also wider than 10 inches because nothing has been done to optimize the placement of the central hubs of the wheels;

GROUP B comprises bicycles such as U.S. Pat. No. 4,182,522 (Ritchie) that (1) fold the rear of the frame down and under about a horizontal axis located behind the seat tube, (2) do not remove the rear wheel when folding, (3) fold the front tube about a vertical axis, and (4) do not remove the front wheel while creating a folded size that can be smaller than the airline 62 linear inch limit when small wheels are used; and GROUP C comprises bicycles such as U.S. Pat. No. 5,586,652 (Smilanick) that have a frame that disassembles after the front and rear wheels have been removed to allow the front frame section, rear frame section, and the two wheels of a bicycle with full size wheels to be separately packed into a 26×26×10 inch case that meets the airline requirements for full-size luggage not subject to a baggage surcharge.

Important differences between the present invention and the above groups of bicycles are illustrated in the table below:

| | Group A | Group B | Group C | Invention |
|---|---|---|---|---|
| Frame fold axis | Vertical | Horizontal and vertical | Disassembled not folded | Horizontal |
| Fits 26 x 26 x 10 | No | Yes | Yes | Yes |
| Full size wheels | Some models | No | Yes | Yes |
| Wheels removed | Typically not | No | Yes | Yes |

The table above shows that embodiments of the present invention are similar to Group C in that a bicycle using full size wheels can fit into the 62-linear inch size (typically 26×26×10 inches if 700C wheels are used). Embodiments of the present invention differ from Group C in that embodiments of the present invention are based on a frame that can be folded, while bicycles in Group C have frames that are disassembled, not folded. The disadvantages of disassembling a bicycle frame can include:

(a) Assembly and disassembly can require special fasteners and/or tools;

(b) The cables that run from the front of the bike (typically on or near the handlebars) to the rear of the bike (for the derailleur and rear brakes, for example) typically need to be disconnected to pack the separable bicycle parts;

(c) The separable parts might need to be wrapped to keep them from rubbing against each other and causing damage;

(d) It might require detailed instructions, practice, and finesse to place each separable part in the case; and (e) The entire process of disassembly and packing the bicycle is likely to take significantly more time than if at least the main bicycle frame sections could be folded together instead of needing to be detached from each other.

For the above reasons, it is highly desirable to fold as many parts of the bicycle instead of disassembling and packaging these parts.

3. Frame and Steering Folding

Referring now to the drawings, FIG. 1A shows a prior art folding bicycle in its unpacked or "ride" mode (rideable configuration). This prior art folding bicycle comprises a prior art folding bicycle frame 400, a spoked first wheel 120 that is also a front wheel, a first tire on the first wheel 182, a second wheel 180 that is also a rear wheel, and a second tire 184 on the second wheel. It should be noted that that the front wheel 120 is an annulus front wheel with a removable hub of a type that will be described later in this document. The prior art folding bicycle of FIG. 1A uses rim brake calipers 436 as part of a rim braking system. These rim brake calipers 436 typically sit in front of the crown of the front fork.

The prior art folding frame 400 comprises a rear frame section that connects to the rear wheel 180 and a front frame section that connects to the front wheel 120. The rear frame section and front frame section fold at a folding frame pivot axis shown at 318. This fold occurs in a plane substantially aligned with the front and rear wheels when the bicycle is in ride mode and positioned for riding in a straight line. When in ride mode, the front and rear frame sections are secured at a folding frame clamp unit (folding frame fastening module) shown at 320.

Further referring the prior art folding bicycle shown in FIG. 1A, the front frame section of this prior art embodiment can include a front tube 306, which could also be called a top tube, a front frame tube, or a down tube. A head tube 304 can be permanently attached one end of the front tube 306. The folding frame pivot axis 318 and folding frame clamp unit 320 are located at the opposite end of this front tube 306. The front frame section further comprises a rim brake front fork 414 that comprises:

(a) one or more fork blades that connect to the front wheel at one end and to a fork crown at the other;

(b) a steerer (or steerer tube) that is attached to the fork crown, the steerer extending in a direction opposite to the fork blade(s) and being rotationally coupled inside of the head tube 304 to steer the bicycle; and (c) the front rim brake calipers 436 mentioned previously that sit forward of the fork blades, fork crown, and steerer tube.

In the prior art embodiment shown in FIG. 1A, the handlebars 428 are attached to a stem 426. This connection of the steerer to the stem 426 and then to the handlebars 428 can either be a direct connection, or it can include a second steerer (also known as a steerer extender or telescoping steerer 424 and optional tool free handlebar height and rotation module 422. In this prior art embodiment, the steerer extender 424 is collinear with the steerer that is part of the rim brake front fork 414.

Additional components shown in FIG. 1A include pedals 328 connected to cranks 322 (one on the starboard side of the frame and one on the port side of the frame) that are connected to a main seat tube 316 (which is part of the rear frame section) through a crankshaft and bottom bracket housing (also part of the rear frame section) that are not visible in FIG. 1A. The bottom bracket housing can be fixedly, permanently, and immovably attached to the main seat tube 316. The pedals 328 could be user removable without needing any tools. Examples of tool-free user-removable pedals can include MKS EZY pedals, Wellgo POP-OFF pedals, and DAHON QUICK DRAW pedals. FIG. 1A also shows a front chain ring 330 that connects the cranks 322 to a bicycle chain 324 (or belt), an optional rear derailleur 314, a seat 332, a seat post 334 that is connected to the seat 332, and a telescoping seat tube 336 that connects the seat post 334 to a main seat tube 316 in the rear frame section. It should be noted that the telescoping seat tube 336 is optional. In some embodiments, the seat post 334 is directly connected to a main seat tube 316 in the rear frame section.

Figure 1B:
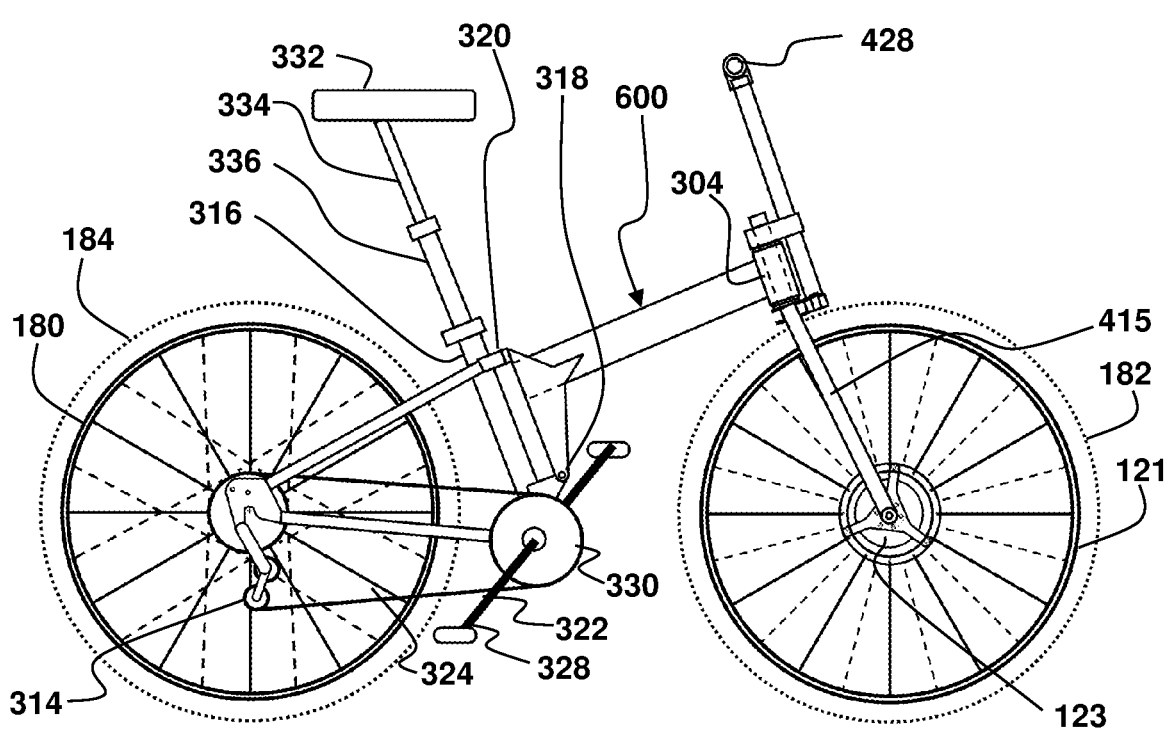
FIG. 1B shows an improved folding bicycle.

FIG. 1B shows an improved folding bicycle in its unpacked or "ride" mode. The improved system comprises an improved folding bicycle frame 600 and the following components and features that are the similar to what was shown with reference to FIG. 1A: rear wheel 180, front tire 182, rear tire 184, derailleur 314, main seat tube 316, folding frame pivot axis 318, folding frame fastening unit 320, seat 332, seat post 334, and telescoping seat tube 336. In the improved folding bicycle of FIG. 1B the front wheel shown at 120 in FIG. 1A has been replaced with a front wheel with disk brake, shown at 121 that further comprises a disk brake rotor 123. This disk brake rotor was not part of the prior art embodiment of FIG. 1A. Instead, the prior art embodiment shown in FIG. 1A used front brake calipers 436 as part of a rim braking system.

The steering system for the improved folding bicycle of FIG. 1B uses a disk brake front fork 415, which substitutes disk brake calipers instead of the rim brake calipers 436 that were shown as part of the prior art embodiment in FIG. 1A. This clears the region in front of the head tube 304 for a different configuration for packing the handlebars 428 and other front section components when folding the improved embodiment shown in FIG. 1B.

FIG. 2A illustrates the improved folding bicycle frame 600 that was shown in FIG. 1B, without the front and rear wheels, pedals, cranks, front chain ring, chain (or belt), rear derailleur, seat, seat post, and telescoping seat tube. In this view of the improved folding frame 600, the folding frame clamp unit 320 has been released and the rear frame section 402 has been rotated slightly relative to the improved front frame section 601. Note that the rear frame section 402 could the same as what was shown in the prior art (which used rim brakes and had an elevated chainstay), or it could be the configuration shown in FIG. 2A, and be configured for using disk brakes. The rear stays in FIG. 2A have rear dropouts 340 at the end of the stays that is opposite of the end of the rear stays that is attached to the seat tube 316. The rear dropouts 340 are configured for holding a side of the center (e.g. central axle) of the rear wheel (180 in FIG. 1B). The rear dropouts can be any connection method for attaching bicycle wheels to a frame capable of being understood by anyone skilled in the art. The drive-side rear stays can have a rear derailleur (shown at 314 in FIG. 1B) mounted near its dropout. The end of the rear stays opposite of the dropouts 340 are fixedly, immovably, and permanently attached to a main seat tube 316 (which can also be called a rear frame section seat tube). The rear stays and main seat tube 316 can be rotatably connected to the connection module 320 of the front section at a folding frame pivot axis 318 through the use of a rear frame pivot element that is permanently attached to the other rear frame section components, and is rotatably connected to a front frame pivot element of the connection module 320 on the front frame section. In one embodiment, a shaft and bushings are used to create the pivot or hinge. The main seat tube 316 (and other parts of the rear frame section) can be rigidly and detachably attached to the front frame section using a rear frame fastening element that is attached to the rear frame seat tube 316. This rigid connection can also be called an immovable connection. The rear frame fastening element can be attached to a front frame fastening element.

The improved front frame section 601 shown in FIG. 2A can comprise a front tube 306 to which a head tube is attached at an end opposite of the folding frame pivot axis 318 and the folding frame clamp unit 320. Further referring to FIG. 2A, the improved front frame section 601 can include a disk brake front fork 415 consisting of a steerer 416 (also called a steerer tube, primary steerer, or first steerer), at least one fork blade 420 configured for attaching the disk brake front wheel, 121 in FIG. 1B, to the front fork 415 using ore or more front dropouts 340 or any similar attachment method capable of being understood by anyone skilled in the art, and a fork crown 318 that connects the primary steerer 416 to the fork blade or blades 420. The primary steerer 416 rotates inside the head tube 304.

The improved front frame section 601 of FIG. 2A further includes a shaft that acts as a second or auxiliary steerer 630, a rotational coupling module 610, and a head tube clamp module 620. This shaft (auxiliary steerer) 630 is parallel to (but not collinear to) the main steerer 416 and located in front of the main steerer. The rotational coupling module 610 (which comprises a front fork hinge block and front fork pivot shaft that will be detailed and described later in this disclosure) allows the auxiliary steerer 630 (second steerer or shaft) to rotate relative to the front fork. The auxiliary steerer 630 can be attached to the rotational coupling module 610 using any means capable of being understood by anyone skilled in the art, such as the welding. The second (or auxiliary) steerer 630 can be secured to the main steerer 416 that is rigidly and permanently attached as part of the fork (first or primary steerer) using a head tube clamp module 620 located at the top of the head tube 304. This configuration allows the head tube clamp to also secure the fork steerer tube 416 (first steerer) into the head tube 304 in the same way as is commonly done on bicycles with a stem. The fork hinge block (coupling module) 610 can be rigidly and fixedly attached to the crown 318 of the disk brake front fork 415 by any means capable of being understood by anyone skilled in the art, such as the use of bolts. A vertical stem 632 or similar can be used to attach the handlebar 428 to the auxiliary steerer (second steerer) 630.

To further clarify, the improved folding bicycle of FIG. 1B that comprises the improved folding bike frame 600 shown in FIG. 2A can have the following attributes:

(a) The frame has an improved front frame section 601 and a rear frame section 402;

(b) The improved front frame section 601 comprises a front frame tube 306 having a head tube 304 attached at one end and a connection module (comprising a clamp unit 320 and folding frame pivot axis 318) at the other end;

(c) The head tube 304 is configured for rotatable attachment to a disk brake front fork 415;

(d) A disk brake front wheel 121 can be mounted into the front fork dropouts 340 and the disk brake front wheel 121 could be one with a removable center section so that the front wheel fits compactly over the center of a rear wheel when the removable center section has been removed;

(e) The steerer 416 in the disk brake front fork 415 is secured inside the head tube 304 using a head tube clamp module 620;

(f) An auxiliary steerer 630 is rotatably attached to a crown 318 of the disk brake front fork 415 using a rotational coupling module 610;

(g) The auxiliary steerer 630 is attached to the head tube clamp module 620 when the bicycle is in a rideable configuration;

(h) The auxiliary steerer 630 is substantially parallel (but not collinear) with the steerer 416 in the disk front fork 415 when the bicycle is in a rideable configuration;

(i) The rotational coupling module 610 allows the auxiliary steerer 630 to rotate about an axis of rotation that is perpendicular to the axis of rotation of the primary steerer 416 inside of the head tube;

(j) The auxiliary steerer 630 is configured for attaching a front handlebar 428;

(k) The improved front frame section 601 has two points of engagement with the rear frame section 402, a pivot connection 318 and a user detachable rigid (immovable) attachment connection 320;

(l) The user detachable connection 320 on the front frame section is used when the bicycle is unfolded and placed into "ride" mode;

(m) The rear frame section 402 comprises a rear frame seat tube 316, a bottom bracket housing, a drive side rear stay and a non-drive side rear stay, all of which are rigidly, securely, immovably, and permanently attached to each other;

(n) The pivot connection 318 allows the improved front frame section 601 to pivot relative to the rear frame section 402 about a horizontal axis that is located in front of the seat tube 316 and in front of the center of rotation of the cranks; and (o) The rigid attachment connection 320 attaches the improved front frame section 601 to the rear frame section 402 at a point proximate to a seat post clamp.

FIG. 2B and FIG. 2C illustrate one method for packing the improved folding bicycle frame shown at 600 in FIG. 2A into a small size. The first step, shown in FIG. 2B is to rotate the rear frame section 402 counterclockwise relative to the disk brake front frame section 601 about an axis that is (a) located at the folding frame pivot axis 318 (b) is perpendicular to the plane of the frame and the plane of the rear wheels, and (c) could also be defined as being parallel to the axis of rotation of the rear wheels and the axis of rotation of the crankshaft in the central axis of the hollow cylindrical bottom bracket housing. FIG. 2B shows the folding frame of FIG. 2A with a rear frame section rotated approximately 180 degrees counterclockwise relative to a front frame section about a pivot point that is forward and above the axis of rotation of the cranks when the bicycle is in a rideable configuration. This rotation of the front frame section by approximately 180 degrees relative to the rear frame section, means that that the parts of the disk brake front fork 415 are proximate to the rear dropouts 340. FIG. 2B also shows that the disk brake front fork 415 and handlebars 428 have been rotated 90 degrees about the axis of rotation of the disk brake front fork 415 inside the head tube 304.

FIG. 2C shows the configuration of FIG. 2B with the handlebars 428 and the auxiliary steerer 630 rotated approximately 120 degrees counterclockwise about a pivot point in front of the head tube 304 and proximate to the fork crown 318, with the resulting folded frame placed into 24×24 inch square with rounded corners, as shown at 202. Using this configuration and folding technique it is possible to fit an entire bicycle frame into a size smaller than 26×26 inches, such as 24×24 inches, 24×22 inches, and/or 22×22 inches. The third dimension (thickness) of any of these folded frames can be approximately 6 inches (the width of the rear dropouts), less than 7 inches, less than 8 inches, less than 9 inches, or less than 10 inches.

Figure 3A:
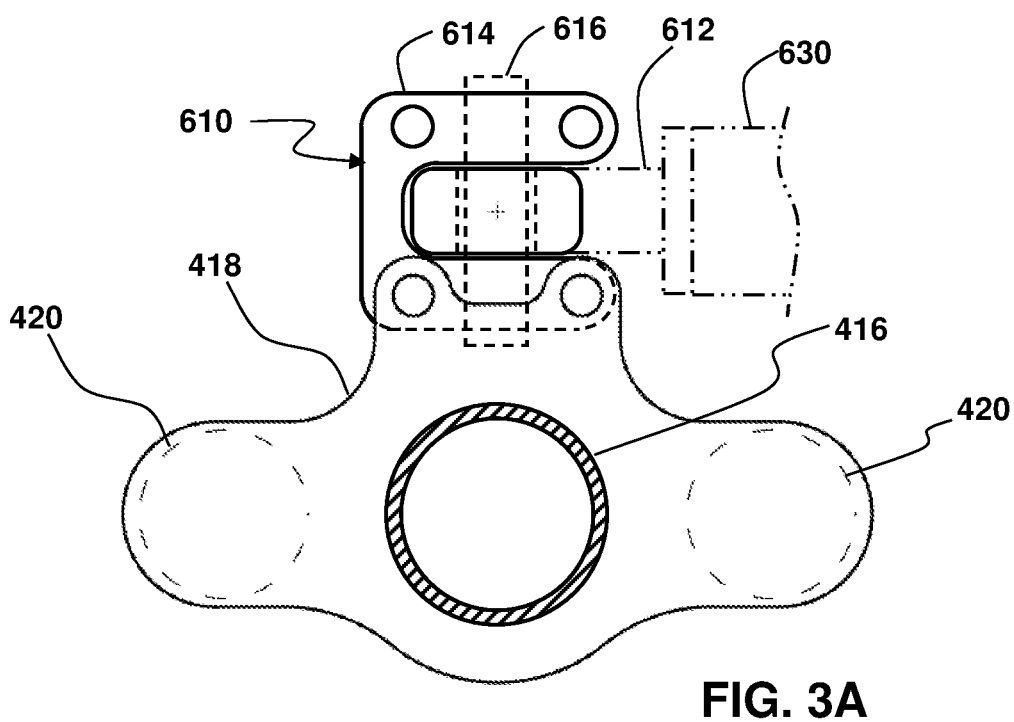
FIG. 3A shows section B-B of FIG. 2A.
Figure 3B:
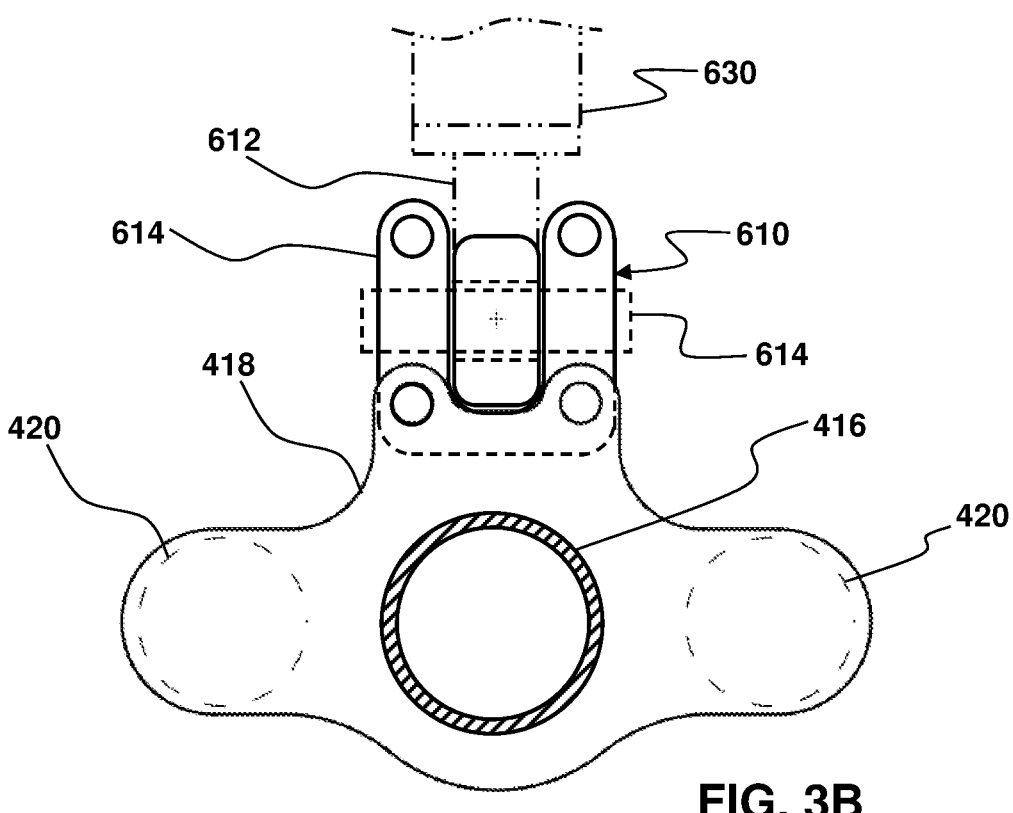
FIG. 3B shows an alternate configuration from FIG. 3A in which the hinge block is rotated to allow an auxiliary steerer to rotate forwards.

FIG. 3A shows section B-B of FIG. 2A. For ease of viewing, the auxiliary steerer 630 is shown rotated 90 degrees to the right with phantom lines. FIG. 3B shows an alternate configuration from FIG. 3A in which the hinge block is rotated to allow the auxiliary steerer 630, as shown by phantom lines, to rotate forwards. In both FIG. 3A and FIG. 3B, the axis of rotation of the auxiliary steerer 630 is perpendicular to the axis of rotation of the main steerer, shown sectioned at 416. The fork crown is shown at 418 and the fork blades are shown by hidden lines at 420, because they extend down from the fork crown 418. The front fork rotational coupling module 610 comprises a pivot shaft 612 inside of a hinge block 614. The pivot shaft 612 can rotate inside the hinge block 614 by fabricating these two components as a hinge using any means capable of being understood by anyone skilled in the art, such as the use of a pivot pin 616 that rotationally couples the pivot shaft 612 inside the hinge block 614. The hinge block 614 can be attached to the fork crown using any means capable of being understood by anyone skilled in the art, such as the use of bolts, as shown by the bolt holes in FIG. 3A and FIG. 3B. The auxiliary steerer 630 can be attached to the pivot shaft 612 using any means capable of being understood by anyone skilled in the art, such as welding.

Figures 4A, 4B, 4C:
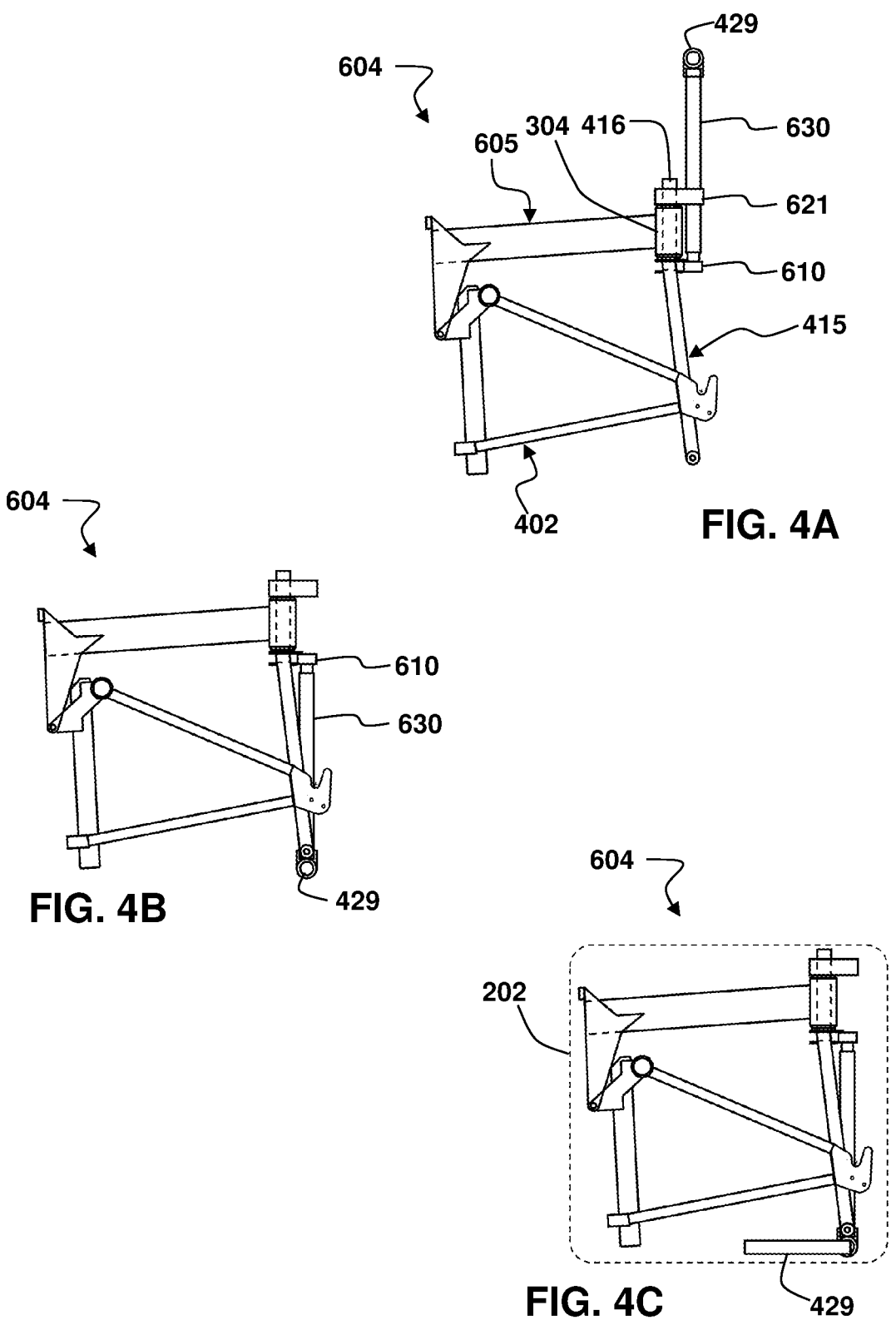
FIG. 4A, FIG. 4B, and FIG. 4C show an alternate folding system using the same concepts as the system shown in FIG. 1B through FIG. 3.

FIG. 4A, FIG. 4B, and FIG. 4C show an alternate folding bicycle frame 604 that uses the same concepts as the improved folding bicycle frame 600 shown in FIG. 1B through FIG. 3B. The primary differences between these folding bicycle frames are:

(a) The alternate frame folds the rear frame section 402 around the outsides of the unrotated disk brake front forks 415, which means that the front brake forks 415 must have a maximum width less than the space between the rear stays. a disk brake fork 415;

(b) The alternate frame uses folding handlebars 429; and (c) The alternate frame uses an alternate orientation for the rotational coupling module 610 and an alternate head tube clamping module 621 that allow the auxiliary steerer 630 to rotate forward instead of sideways. Note that the axis of rotation of the auxiliary steerer in the alternate folding bicycle frame 604 is perpendicular to the axis of rotation of the fork steerer 416 in the head tube 304, but orthogonal to the axis of rotation of the folding bicycle frame shown at 600 in FIG. 1B to FIG. 2C.

More specifically, FIG. 4A shows the alternate folding frame 604 with the rear frame section 402 rotated approximately 180 degrees counterclockwise relative to the alternate front frame section 605, which causes the fork blades of the front fork to fit between the rear stays near the rear dropouts. FIG. 4B shows the auxiliary steerer 630 to be rotated clockwise 180 degrees at the rotational couple module 610, so that the folding handlebars 429 are proximate and below the front dropouts. FIG. 4A shows the folding handlebars 429 folded so that the entire alternate folding frame 604 fits into a 24×24 inch square form factor, shown at 202.

Summarizing what's shown in FIG. 1B to FIG. 4C, embodiments of the invention can include: a front fork with a fork steerer, one or two fork blades, and a crown; a handlebar attached to an auxiliary steerer; a module that rotationally couples the auxiliary steerer to the fork crown; and a clamp module for (a) retaining the fork steerer in a head tube and (b) detachable attachment the auxiliary steerer. The fork blades are configured for attaching a front wheel. The fork crown is used to attach the fork blades to the fork steerer and to rotationally attach the auxiliar steerer to the fork. This configuration allows the auxiliary steerer to be substantially parallel and in front of the fork steerer when a bicycle using embodiments of the invention is in a rideable mode and for the auxiliary steerer and handlebars to be rotated about an axis perpendicular to the axis of rotation of the fork steerer in the head tube to a position that collapses the auxiliary steerer and handlebars when the bicycle is in a packed mode.

4. Compact Storage of Multiple Wheels and Bike in a Bike Case

FIG. 5D, FIG. 5E, and FIG. 5F illustrate elements of three configurations and methods that can be employed in embodiments of the present invention. To understand these configurations and methods, it is best to start with other prior art. FIG. 5A shows an axial view of one or more bicycle wheels 104 in a container 102. In this example, the bicycle wheels 104 are spoked and have the dimensions of standard 700C or 29-inch wheels. This means that the wheels 104 have rims with an outside diameter of approximately 25.5 inches (648 mm). The container 102 has been sized to meet the airline checked luggage requirement of 62 linear inches (1575 mm). Given a 25.5-inch (648 mm) standard outside diameter of 700C bicycle rims, the fact that the rims will most likely have tires on them (which could be deflated), and the fact that the container walls will have a thickness that must be within the total dimensions, the minimum length and the minimum width of the container will be approximately 26 inches. Subtracting 26+26=52 inches from the 62-linear inch size limit, the container can have a maximum height of about 10 inches. Therefore, the container shown at 102 in FIGS. 3A, 3B, 3C, 3D, and 3E is 26×26×10 inches. In the prior art, the typical container used for transporting bicycles in this way could be made of a hard-shell plastic in a clamshell configuration, or it could be a soft-shell bag, or it could be a container made of a combination of hard and soft components.

FIG. 5B, which is a side view of section A-A of FIG. 5A, illustrates the next issue when trying to pack a bicycle into a maximum 62 linear inch airline size container using the systems and methods known in the prior art. Referring to FIG. 5B, a prior art spoked 700C front wheel is shown at 106 and a prior art spoked 700C rear wheel is shown at 108. The standard dropout spacing for a front wheel is 100 mm. The axle typically extends an additional 5 mm per side beyond this 100 mm so the wheel can fit into the front dropouts, making a total axle length of 110 mm (4.3 inches) for a front wheel. The narrowest standard dropout spacing for a rear wheel is 130 mm for a road bike. It is 135 mm for some road bikes and many mountain bikes. The rear wheel also typically has 5 mm of additional axle length on each side in order to fit into the dropouts for a total axle length of 140 mm (5.5 inches). In FIG. 5B, the two wheels 106 and 108 are axially aligned and the total height of the two stacked wheels is therefore 110 mm+140 mm=250 mm, which is approximately 9.8 inches. Thus, the stack height of the two hubs and the two axles almost exactly takes up the entire interior height of the 10-inch high container 102 once the wall thickness of the container is subtracted from 10 inches. Other bicycle parts (such as the frame, handle bars, pedals, seat, etc.) must fit into the remaining space or must be placed into a second piece of luggage, which could cost extra. The remaining space in a container 102 in the prior art systems and methods for packing a bicycle are minimal and broken up into multiple small regions. Tilting the wheels as shown in FIG. 5C does not give much additional space because it is not possible to tilt the wheels to a very great angle and stay within the 26×26×10 inch physical volume. Thus, many compromises must be made, it takes a considerable time and experimentation to try to get the bike to fit at all, and many people give up on this packing method as a solution. Furthermore, fitting the bike wheels, frame, and components into the container in this way can result in damage as parts rub against each other. To prevent damage caused by rubbing, each part is typically individually wrapped in a protective material, which requires additional time, items, space, expense, and weight.

FIG. 5D illustrates a configuration and method that simplifies compact packing of a bicycle of the same size. The container 102 and rear wheel 108 shown in FIG. 5D are the same as the prior art illustrated in FIG. 5A, FIG. 5B, and FIG. 5C. The configuration of the spoked front wheel, shown at 110 in FIG. 5D, has been changed by replacing the central hub assembly, shown at 112 in FIG. 5B and FIG. 5C with an annulus (or annular module or ring-shaped module), shown at 114 in FIG. 5D, and a user removable hub (or other removable module for connecting the annulus wheel to the rest of the bicycle) shown at 116. The annulus 114 has a concentric central aperture region. This central aperture region of the annulus allows at least part of the thick central hub (and axle) of the rear wheel 108 to nest inside the front wheel 110. As shown in FIG. 5D, the entire space in the container 102 above (or to the side, depending upon how one looks at it) the rear wheel 108 then becomes clear and available for packing other parts of the bicycle. The rear wheel 108 in FIG. 5D sits at the same position in the container 102 as for the prior art (FIG. 5B and FIG. 5C). Thus, the wheel configuration with a removable hub greatly facilitates the packing of a bicycle. The two wheels with the removable hub shown in FIG. 5D represent a simple embodiment of a packable bicycle that fits into 62 linear inches. Advantages of the front wheel embodiment shown in FIG. 5D can include:

(a) more compact storage of the bicycle (especially if this is a bicycle using full-size wheels);

(b) potential for storing two bicycles with traditional mountain bike wheels, that are smaller than 700C wheels, into a 62-linear inch size package;

(c) improved potential (due to having more space) for rigidly (i e immovably and securely) attaching bicycle parts together to eliminate the need for wrapping each bicycle part prior to packing; and (d) more room for the other bicycle components allows for more soft padding on the outside of the packed bicycle, which makes it easier to eliminate the weight, cost, and transportation of a hard-shell suitcase.

The two wheels illustrated in FIG. 5D do not necessarily need to be a front wheel with a central annulus 110, a removable hub 116, and a rear wheel with a non-removable hub 108. The rear wheel could have a removable hub. The front wheel could have a fixed hub. The two wheels could be two front wheels. The two wheels could be two rear wheels. The two wheels could be two wheels from a vehicle that has more than two wheels. The two wheels could be for two different vehicles. The two wheels could both have removable hubs. One or both of the two wheels could have removable centers that are not hubs, they could be removable axle assemblies, for example, with the bearings being in the front wheels and the central annulus being inside the races of the bearings. To illustrate examples of such embodiments, FIG. 5E and FIG. 5F show a configuration in which the front wheel and the rear wheel 110 both comprise an annulus 114 with detachable hubs, 116 and 117. The user-detachable front hub is shown at 116 and the user-detachable rear hub is shown at 117. This front hub 116 and rear hub 117 could be placed anywhere in the space available, such as embedded partially in the spoked wheels, as shown in FIG. 5E or completely in the volume reserved for the bicycle frame, as shown in FIG. 5F. This flexibility in where the two hubs 116 and 117 are placed helps to maximize the efficiency of using the available space.

In the configuration shown in FIG. 5E, the two wheels with central annuli 110 are adjacent to each other in the 26×26×10 inch container, 102. In the configuration of FIG. the two wheels 110 are on opposite sides of a flexible 26×26×10 inch bag 103. Placement of the two annular spoked wheels 110 in the configuration shown in FIG. 5F can have the following advantages:

(a) any small protrusions of the bike frame components can extend through the spoke region of the wheels 110 and the entire packed bicycle can still fit within the overall 10-inch height;

(b) the sides of the annular spoked wheels 110 can be part of the protective structure for the packed bicycle on the 26×26 inch top and bottom surfaces of the volume;

(c) the rims (typically with rubber tires on them) can protect the 26×10 inch front, rear, right side, and left side surfaces of the volume as shown in FIG. 5F; and (d) by using the wheels as part of the protective structure, the storage device 103 can be have fewer or no rigid (or hard) components, such as the flexible 26×26×10 inch bag, shown at 103. A storage device 103 with few or no hard components will also pack more easily when not used to store the bicycle.

Figure 6A:
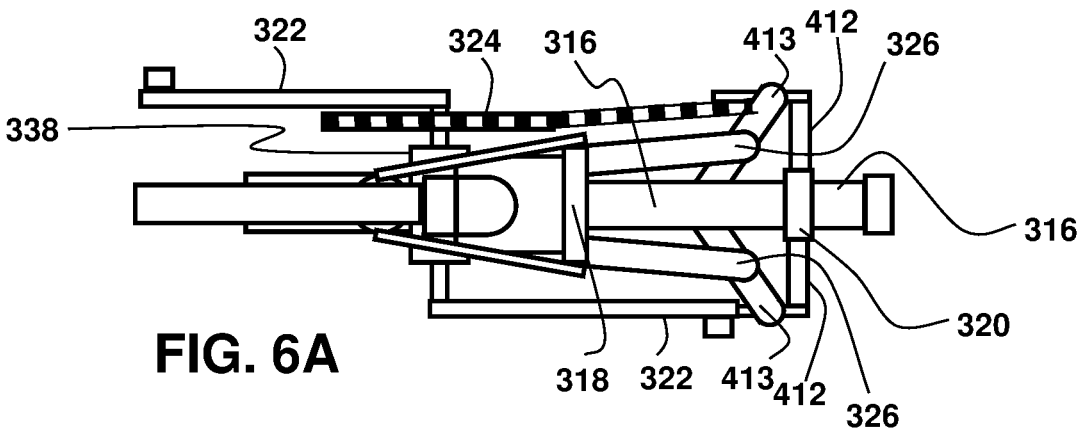
FIG. 6A shows a side view of the folded bicycle frame of FIG. 2C.
Figure 6B:
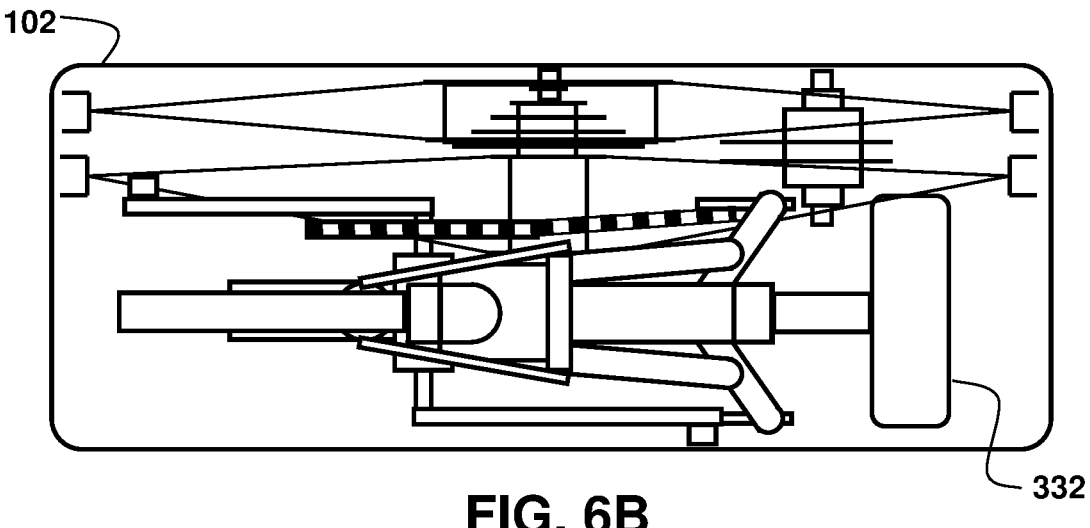
FIG. 6B shows the folded bicycle frame of FIG. 6A and the front and rear wheels and seat of FIG. 1A packed into a 26×26×10 inch physical volume similar to the configuration that was shown in FIG. 5D.
Figure 6C:
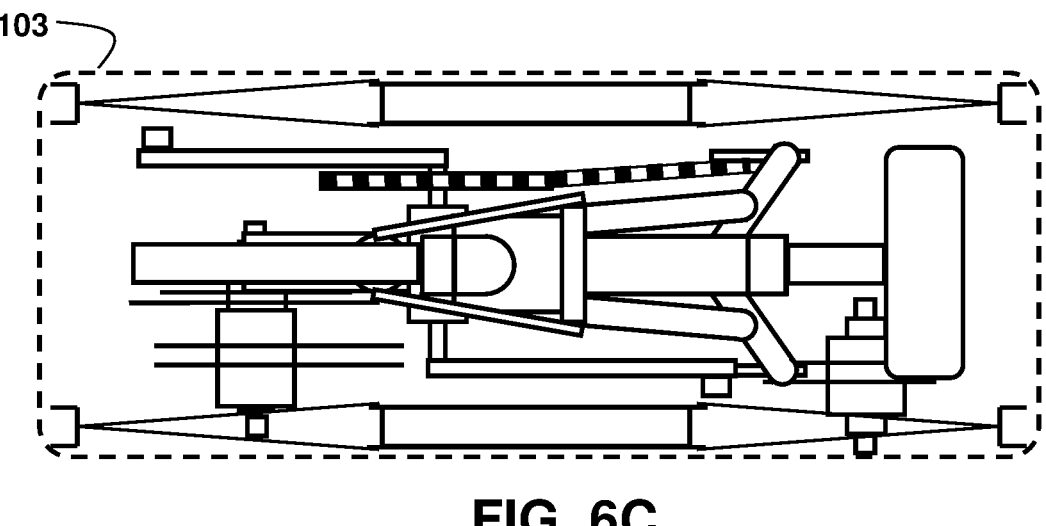
FIG. 6C shows the folded bicycle frame of FIG. 6A and the front and rear wheels of FIG. 5E packed into a 26×26×10 inch physical volume similar to the configuration that was shown in FIG. 5F.

FIG. 6A shows a side view (which could also be called an end view) of a folded bicycle frame similar to the folded frame of FIG. 2C along with front and rear wheels of the type shown in FIG. 5D, FIG. 5E, and FIG. 5E, as well as several other components that were were in FIG. 1B, but removed in FIG. 2C. FIG. 6B shows how this entire bicycle, including the wheels can be packed into the 26×26×10 inch container 102 of the configuration that was shown in FIG. 5D. FIG. 6C packs everything into the flexible 26×26×10 inch bag 103 of the configuration that was shown in FIG. 5F. To help in understanding these illustrations:

(a) the seat is shown at 332;

(b) the lower rear stays are shown at 413;

(c) the upper rear stays are shown at 412;

(d) the bicycle chain is shown at 324;

(e) the rear stay stiffeners are shown at 326;

(f) the cranks are shown at 322;

(g) the bottom bracket housing (crankshaft housing) is shown at 338;

(h) the lower pivot element is shown at 318;

(i) the user detachable upper attachment element is shown at 320; and (j) the main seat tube is shown at 316.

5. Wheel with Central Annulus

Figures 7A, 7B, 7C:
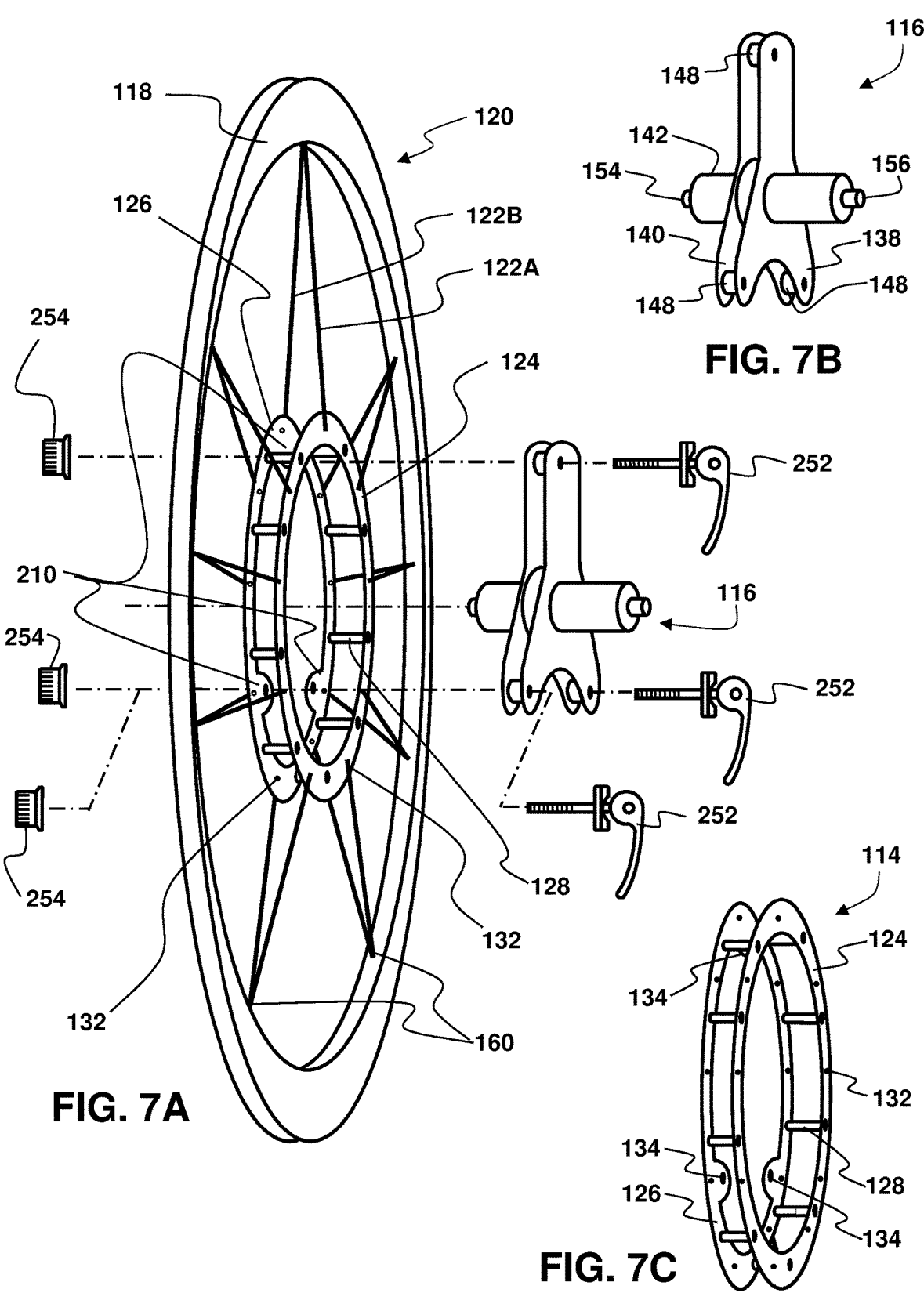
FIG. 7A shows a perspective view of a spoked bicycle wheel with a central annulus, a user detachable hub, and three eccentric cam quick release mechanisms to attach the annulus to the hub.
FIG. 7B shows the user detachable hub of the wheel of FIG. 7A.
FIG. 7C shows the central annulus of the wheel of FIG. 7A.

FIG. 7A shows a perspective view of a spoked wheel 120, and a user detachable hub 116. The hub 116 shown in FIG. 7A could also be called a removable front wheel center module. The wheel 120 and hub 116 could be used to facilitate the packing of a bicycle, as was shown and described with reference to FIG. 5D, FIG. 5E, and FIG. 5F. The spoked wheel 120 can be of any size and shape capable of being understood by anyone skilled in the art. Common human powerable vehicle spoked wheel tire sizes can include 700C/29 inch, 650B/27.5 inch, 26 inch, 24 inch, 20 inch, and 16 inch as were described earlier in this document. The spoked wheel 120 comprises a rim, shown at 118, an inner annulus (or inner annular module or ring-shaped module) 124 and/or 126, and a plurality of spokes, shown at 122A and 122B that radiate outwards from the inner annulus to connect the annulus to the rim. The rim 118 is circular and is located concentrically to the central axis of the wheel 120. It should be noted that the rim 118 could be of any other size capable of being understood by anyone skilled in the art. The rim used on a wheel of a human-powerable vehicle can be made of any material capable of being understood by anyone skilled in the art. Examples of rim materials include aluminum, steel, titanium, wood (such as birch, spruce, oak, etc.), carbon fiber reinforced composite, glass fiber reinforced composite, glass, and plastic. The rims can be fabricated using any process capable of being understood by anyone skilled in the art including the use of extrusion, machining, casting, molding, bending, stamping, autoclaving, heating, vacuum forming, injection molding, riveting, and welding.

The spoked wheel 120 shown in FIG. 7A has 18 spokes. Other common spoke counts can include 3, 4, 5, 6, 8, 10, 12, 16, 18, 20, 24, 28, 32, 36, 40, 48, 72, 96, and 144 spokes. The spoke count can be any quantity capable of being understood by anyone skilled in the art. The inner annulus includes spoke-to-annulus attachment points, shown at 132. These spoke-to-annulus attachment points 132 are configured for spokes, 122A and 122B, that radiate outwards from the inner annulus. In the embodiment shown, the spoke-to-annulus attachment points 132 are in a circular configuration on two offset parallel planes separated by spacers 128. In the embodiment shown, the spacers 128 comprise a plurality of threaded tubular elements, having internal threads.

FIG. 7C provides a view of just the central annulus 114 of the wheel that was shown at 120 in FIG. 7A. The circular configuration of the spoke-to-annulus attachment points 132 is concentric to the center of the wheel 120. In the embodiment shown, the spoke-to-annulus attachment points 132 are axial through holes. In the embodiment shown, the two offset (non-co-planar) parallel planes are in the form of two annular (or ring shaped) disks, 124 (first annular disk) and 126 (second annular disk), and are separated by the annular disk spacers 128. These annular disks 124 and 126 could also be called rings or annuli. In the embodiment shown, the annular disks, 124 and 126, are located concentrically to the central axis of the wheel, providing a central annulus that is concentric to the axis of rotation of the rim.

Referring to the embodiment shown in FIG. 7A, the spokes, 122A and 122B, are configured to be in tension. The spokes, 122A and 122B, are in a generally triangular configuration if the wheel was looked at in a section view, with the two planes of spoke-to-annulus attachment points 132 being offset. The spokes, 122A and 122B, are connected to the rim 118 at rim spoke attachment points, shown at 160. In the embodiment shown, the rim spoke attachment points 160 for all spokes are in a common plane, in a circular configuration, and concentric to the axis of the axis of rotation of the wheel. The resulting configuration of the spokes, 122A and 122B, can also be described as approximating two cones (more specifically conical frustra), which if the tops where not cut off, would have their apexes in the center of rotation of the wheel. It is also possible for the rim spoke attachment points 160 to be located in multiple offset parallel planes. For example, it is possible to attach the spokes from the first annular disk 124 to a plane on the rim that is offset and parallel to the plane on the rim where the spokes from the second annular disk 126 are attached. In the embodiment shown, the rim spoke attachment points 160 are radial through holes in the rim 118. The placement of the spokes, 122A and 122B, from the spoke-to-annulus attachment points 132 to the rim 118 can be in any configuration capable of being understood by anyone skilled in the art. The type of spokes, 122A and 122B, used can be any type of spoke capable of being understood by anyone skilled in the art. A typical example is spokes having shafts that comprise stainless steel (an alloy of iron, nickel, and other materials) and nipples (used by a user or bike shop mechanic to tension the spokes by rotation) that comprise brass. It is also known to use plastic or composite spokes that comprise carbon fiber or Kevlar (TRADE). The spokes 122A and 122B described herein are user-tensionable spokes, which means that they will have a feature that allows a user to change the length. Such a tensioning feature is typically threads on one end of the spoke that engage with a helically threaded nipple that can be rotated to tighten or loosen the spoke and therefore adjust spoke tension.

Further referring to FIG. 7A, the embodiment of the user detachable hub shown at 116 has three fingers that extend radially. The three fingers comprise hub attachment points. The user detachable hub 116 can be attached to the wheel 120 by a user without significantly affecting spoke tension as will be described in the sections that follow. The system shown in FIG. 7A uses three eccentric cam quick release devices, comprising eccentric cam quick release mechanisms, shown at 252, and hand tightenable nuts, shown at 254. These quick release mechanisms are also shown in, and described with reference to, FIG. 13B. It can be understood that the user detachable hub 116 will be at least partially inside of the central aperture of the annular module when the hub is installed in the wheel.

The annulus module 114 in FIG. 7C can also be called an inner annulus, an inner annular module, or a ring-shaped module. The annulus 114 shown in this embodiment comprises two parallel annular disks, shown at 124 and 126, separated by nine disk spacers, shown at 128. The disk spacers 128 can be attached to the annular disks, 124 and 126, by disk-spacer assembly bolts that engage internal threads in the disk spacers 128. The annular disks, 124 and 126, comprise spoke-to-annulus attachment points, shown at 132. The spoke-to-annulus attachment points 132 are configured for spokes that will radiate outward from the annulus 114. The spoke-to-annulus attachment points 132 are in a circular configuration. In the embodiment shown, the spoke-to-annulus attachment points 132 are axial thru holes designed for spokes with j-bends. The spoke-to-annulus attachment points 132 can be any other type of attachment point capable of being understood by anyone skilled in the art, such as radial through holes, and attachment points that comprise slots. The embodiment of the annulus 114 shown has 9 spoke attachment points per disk, for a total of 18 spoke-to-annulus attachment points 132. There can be any number of spoke-to-annulus attachment points 132 per annular disk above a minimum of 2 and the number of spoke-to-annulus attachment points 132 does not need to be the same for both annular disks. The annulus 114 also includes three hub attachment points shown at 134.

One important benefit of having an annulus is that the center of the wheel is open. This provides the opportunity for part of a second wheel to nest inside of this annulus to reduce overall stack height for multiple wheels. An analysis of various wheels and hubs has identified the following diameters as being typical for the centers of wheels that one might want to nest inside the annulus:

| Diameter of a hub in various locations | Typical diameter |
| --- | --- |
| Outside diameter on non-cassette side for a rear wheel that does not have disk brakes taken 1 inch from end of axle | 1 inch (25 mm) |
| Outside diameter of a disk brake flange | 2 inches (50 mm) |
| Outside diameter of an 18-tooth cog | 4 inches (100 mm) |
| Outside diameter of a 36-tooth cog | 6 inches (150 mm) |
| Outside diameter of a 42-tooth cog | 7 inches (175 mm) |
| Outside diameter of a 48-tooth cog | 8 inches (200 mm) |
| Outside diameter of a large disk brake | 8 inches (200 mm) |

Given the information above, it is beneficial to have the aperture of the annulus be as large as possible, and 1 inch (25 mm), 2 inches (50 mm), 4 inches (100 mm), 6 inches (150 mm), 7 inches (175 mm), and 8 inches (200 mm) are good targets to shoot for.

FIG. 7B provides more detail of an embodiment of a user detachable hub at 116, which was also shown in FIG. 7A. The detachable hub 116 comprises two parallel spiders, shown at 138 and 140 that are attached to a hub body (or sleeve), shown at 142. Each spider has three fingers that extend outwards to annulus attachment points. In the embodiment shown in FIG. 7A and FIG. 7B, There are three finger spacers, shown at 148, which ensure that the fingers of the parallel spider are in the correct positions and can be compressed when placed into the annulus 114 in FIG. 7C. The detachable hub also comprises a central axle, which has two frame attachment regions, one on each end, shown at 154 and 156. These frame attachment regions, 154 and 156, will fit into the dropouts on a bicycle frame. For example, if this is a hub for a front wheel, the frame attachment regions, 154 and 156 will fit into the dropouts on the front fork of the bicycle frame. If this is a hub for a rear wheel, the frame attachment regions will fit into the dropouts on the rear triangle of the frame, which are typically either part of the chain stays, the seat stays, or of an integrated rear triangle that comprises both seat stays and chain stays. The detachable hub 116 also comprises bearings (typically 2 sets), which are typically inside the hub body (or sleeve) 142 and allow the sleeve 142 to rotate about the axle. The remaining parts and configuration possibilities of the detachable hub can be similar to other bicycle hubs and capable of being understood by anyone skilled in the art. For example, the central axle can be a hollow cylinder that is designed for attachment to a bicycle frame using a quick release skewer capable of being understood by anyone skilled in the art. The bearings can be cartridge bearings or open unsealed bearings.

Alignment of the rim and tire to the center of rotation of the wheel at its axle is one of the technical challenges in configuring, designing, fabricating, and using a strong and reliable bicycle wheel. This alignment is more difficult if the wheel comprises a hub that is detachable from the other wheel components, such as the embodiments described herein—where misalignments can occur at the interface between the annulus and the detachable hub. There are two alignments necessary:

(1) Concentricity (also known as radial alignment, runout, or eccentricity), which can be defined as the distance the axis of rotation of the wheel moves up and down as the wheel rolls on a flat surface, and is also the alignment of the axis of rotation of the hub (i.e. the axle) with the axis of rotation of the rim; and (2) Axial alignment, which can be defined as the distance the rim of the wheel wobbles in a direction parallel to the axis of rotation as the wheel rim rotates 360 degrees about the axle.

Figures 9A, 9B, 9C, 9D:
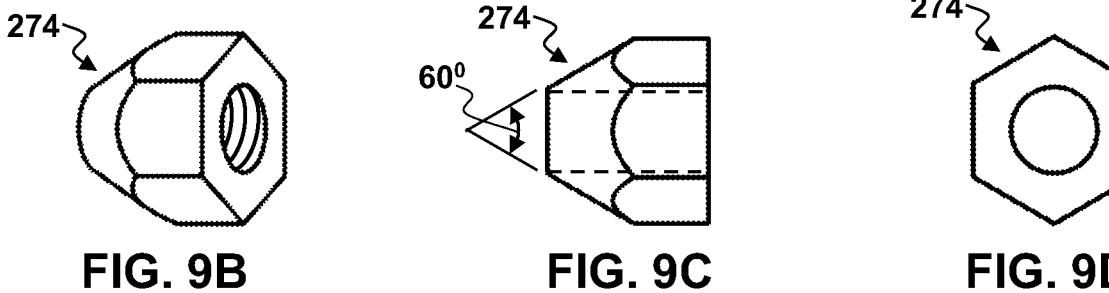
FIG. 9A shows section C-C of FIG. 8B.
FIG. 9B provides a close-up perspective view of a lug nut suitable for the assembly shown in FIG. 8A to FIG. 9A.
FIG. 9C is a side view of the lug nut of FIG. 9B.
FIG. 9D is an end view of the lug nut of FIG. 9B.

In the embodiments described herein, axial alignment can be facilitated by ensuring that the (a) the spider (or other part of the detachable hub) has a flat surface that is perpendicular to the axis of rotation of the hub in the region of engagement with the annulus; (b) that the annulus has a flat surface that is parallel with the axis of rotation of the rim in the regions of engagement with the spider (or other hub part); and (c) that the spider (or other hub part) surface is pressed against the annulus surface. In the embodiments described herein, radial alignment can be facilitated by using a conical feature to press the annulus to the spider (or other part of the hub module). FIGS. 6A to 7D illustrate an embodiment that uses these principles to facilitate radial and axial alignment. More specifically: FIG. 8A shows a perspective view of another assembly comprising an alternate annulus module 115, an alternate user detachable hub module 216, and three lug nuts 274 with conical frustum surfaces. The three lug nuts are configured for user attachment and detachment of the alternate annulus 115 to the alternate hub module 216. It can be understood that these lug nuts 274 will apply a force parallel to the axis of rotation of the rim, and parallel to the axle when the lug nuts are tightened. FIG. 8B shows an end view of the assembly of FIG. 8A with the alternate annulus module 115, the alternate hub module 216, and the three lug nuts 274. FIG. 8C shows an exploded view of the assembly of FIG. 8A with the alternate annulus module 115, the alternate hub module 216, and the three lug nuts 274. FIG. 9A shows section C-C of FIG. 8B, and this section view also illustrates the alternate annulus module 115, the alternate hub module 216, and one lug nut 274.

Further referring to FIG. 8C and FIG. 9A, the alternate annulus module 115 comprises a first annular ring 124 and a second annular ring 126, which can be similar to the rings that were described previously. The alternate annulus module 115 is configured for 36 spokes and there are 18 spoke holes (also referred to as spoke to annulus attachment points) on each ring, examples of which are indicated at 132. The spoke holes on both rings are on the same circular diameter, but the spoke holes on one ring are rotated 10 degrees from the spoke holes on the other ring so there is one spoke hole every 10 degrees with the spoke holes alternating between rings. The second annular ring in this embodiment has three mounting tabs similar to what was shown at 210 in FIG. 6 and the first annular ring in this embodiment does not have mounting tabs, which is also the same as for the embodiment shown in FIG. 6. The alternate annulus module 115 comprises six disk spacers, examples of which are indicted at 128, and three alternate annulus-to-hub mounting blocks, shown at 222. There are three hub-to-annulus attachment bolts 150 that have a tapered engagement surfaces that fit chamfers in the mounting tabs of the first annular ring 126. These hub-to-annulus attachment bolts 150 are threaded into the alternate annulus to hub mounting blocks 222.

Continuing with the description of FIG. 8C and FIG. 9A, the alternate hub module 216 comprises a single thick spider, shown at 260, that is attached to a hub body (or hub shell or sleeve) 142, similar to what has been shown previously, using six spider attachment bolts, examples of which are shown at 144. This single thick spider 260 looks more like a spider web, and can also be called a mounting frame. This mounting frame 260 is monolithic. The mounting frame 260 can be fabricated from flat metal plate that is waterjet cut, laser cut, or cut in some other way capable of being understood by anyone skilled in the art. This produces a component that is highly functional for this application and yet low cost to manufacture. The lug nuts 274 comprise helical threads that are threaded onto the hub to annulus attachment bolts 150 and tightened so that the conical surfaces of the lug nuts 274 engage with conical chamfers in the single thick spider 260 (or mounting frame) to provide a secure engagement that minimizes eccentricity and angular misalignment (wobble) as described previously. The mounting frame 260 has ribs that run directly between the three conically-chamfered mounting features to maximize the stiffness to weight ratio of the mounting frame 260. The alternate hub module 216 also comprises an axle 152 which is coupled to the hub shell or sleeve 142 with two bearings, shown at 158. There are frame attachment regions 154 and 156 shown at the two ends of the axle 152. The axle 152 has a central through hole so that the system can be attached to the front or rear of a bicycle or other human powerable vehicle frame using quick release skewers (i.e. quick release mechanisms such as those shown in FIG. 13B), with one frame attachment region 154 and 156 on each leg of the front fork.

The geometry of the lug nuts 274 is shown in greater detail in FIG. 9B (isometric view), FIG. 9C (side view), and FIG. 9D (end view). In one embodiment, the included angle of the conical section of the lug nut is 60 degrees, as shown in FIG. 9C. This angle has been determined to optimize the axial clamping force and radial alignment force to provide the best alignment of the spoked wheel (such as 120 in FIG. 7A) with the axis of rotation of the hub. The axial clamping force is the force in the direction parallel to the axis of rotation of the rim that presses the hub (and more specifically the mounting frame or spider 260) against the annular module (and more specifically the annulus-to-hub mounting block 222). The radial alignment force is the force in a plane perpendicular to the axis of rotation of the rim, which is typically in an orientation aligned with a radial vector extending into or out of the center of rotation of the rim. This radial force is transmitted from the conical frustum surfaces of the lug nuts 274 to the conical chamfers in the mounting frame or spider 260 in FIG. 9A. The interface between the conical frustum sections of the lug nuts 274 with the conical chamfers of the mating mounting frame or spider 260 can ensure repeatable concentric alignment of the axis of rotation of the hub with the axis of rotation of the rim.

It should be noted that the embodiments shown in FIG. 8A through 7A use lug nuts. It is also possible to make embodiments of the present invention that use lug bolts. Referring to FIG. 9A, the lug nut 274 and hub annulus attachment bolt 150 could be replaced with a lug bolt that is threaded into the annulus to hub mounting block 222. It should also be noted that the conical chamfer feature that the lug nut 274 and annulus attachment bolt 150 (or a lug bolt) could be reversed so that the conical chamfer is on the mounting block 222 of the annular module instead of on the spider or mounting frame 260 that is part of the hub module.

Embodiments of the wheel system shown in FIG. 7A to FIG. 9D can be configured to allow a wheel to be trued very accurately once and to stay true even after the hub had been removed and installed multiple times. This can be accomplished by:

(a) Providing an orientation feature on the annular module;

(b) Providing an orientation feature on the hub module;

(c) Aligning the hub module and annular module orientation features when assembling the wheel;

(d) Truing the wheel with a hub module properly aligned with the annular module; and (e) Always installing the hub module in the same alignment as when the wheel was trued.

The above procedure ensures that the hub module is always attached to the annular module with the same mounting feature of the hub module being connected to the same hub attachment point on the annular module. By following the above procedure, it is possible to true the wheel more precisely than the tolerances of the parts being used since the truing process can be used to compensate for any dimensional errors.

The orientation features on the hub module and the annular module can be any orientation feature capable of being understood by anyone skilled in the art, examples of which can include, but are not limited to:

(a) One or more stamped markings on the hub module and/or annular module, rim, or a spoke;

(b) One spoke, bolt, mounting block, or region of the spider, an/or other item that is a different color or shape or that has a special marking;

(c) A label or piece of tape on the hub module and/or the annular module, rim, or a spoke;

(d) A printed symbol on the hub module and/or the annular module, rim, or a spoke;

(e) The use of an existing orientation physical feature on the rim, such as the tire stem hole, the weld like, or an existing label on the rim; and/or (f) A deliberate asymmetry in the location or shape of the attachment regions of the hub module and/or annular module that prevent the hub module and annular module from being assembled in anyway other than the preferred orientation.

The truing process of the user-tensionable spokes in the wheel embodiments described herein can be performed in the following way to accomplish the following objectives:

(a) Ensure that the spokes have a right amount of tension, typically about 100 kilograms of force and in the range of 60 to 140 kilograms of force;

(b) Ensure that the wheel has the appropriate dish (i.e. that the center of the rim is equidistant from the first frame attachment region 154 and second frame attachment region 156 (which can be seen in FIG. 7B and FIG. 9A and is done by increasing the tension of the spokes going to one of the planes, shown at 124 in FIG. 7A relative to the spokes going to the other plane, shown at 126 in FIG. 7A);

(c) Optimize concentricity (also known as radial alignment, runout, or eccentricity and described in more detail previously in this document) by tightening spokes at one clock position of the rim and loosing spokes at the opposite clock position of the rim; and (d) Minimize wobble (i.e. optimize axial alignment as described in more detail previously in this document) by tightening the left-side spokes relative to the right-side spokes in a region to pull a region of the rim leftwards or vice versa.

Figure 10:
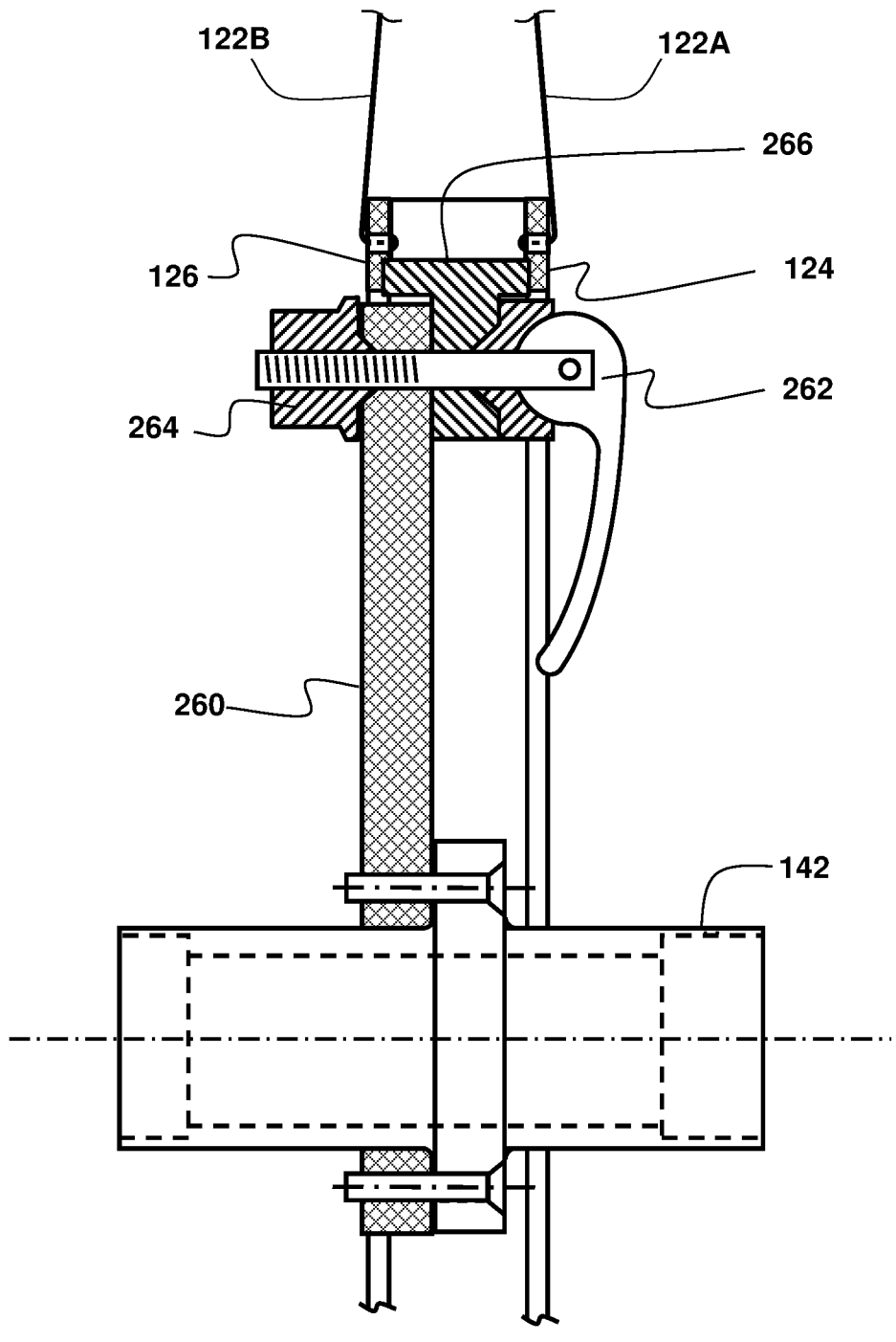
FIG. 10 is a section view of an embodiment that incorporates the conical lug nut principles of the embodiment shown in FIG. 8A to FIG. 9D with one or more an eccentric cam quick release mechanism to create a conical attachment element that is also an eccentric quick release mechanism.

FIG. 10 shows a section view of an annulus module and hub module that incorporates configuration elements from multiple embodiments that have been described in this document. This configuration addresses the following technical requirements:

(a) Lateral deflection of the rim as a result of lateral forces on the rim is reduced by because a single thick spider (mounting frame) 260 can be stiffer than a pair of spiders, such as the spider pair 238 and 240 in FIG. 7A;

(b) Having the flat surface of the mounting frame 260 rest directly against the flat surface of the mounting block 266 for this configuration, minimizes wobble of the rim of the wheel; and (c) The use of a hand-tightenable nut with conical attachment interface, shown at 264, to clamp accurately to the single thick spider 260, and the use of an eccentric cam quick release mechanism with conical interface, shown at 262, to clamp accurately to a mounting block with conical feature, shown at 266, combines the ability to repeatably locate the hub concentrically to the rim, even as components wear, that was also shown in the embodiment of FIG. 8A to FIG. 9D, with the cam-actuated tool-free fastener that was shown in the embodiments of FIG. 7A to FIG. 7C.

The embodiment shown in FIG. 10 can be implemented using the same first annular ring 124 and second annular ring 126 that were shown with reference to FIG. 7A through FIG. 9A. The near spokes 122A and far spokes 122B could also be implemented in the same way as in previous figures. The hub body (hub shell or sleeve) 142 shown for the embodiment in FIG. 10 can also be very similar to the hub body, hub shell, or sleeve 142 that was shown in the other embodiments.

It should be understood that the wheel embodiments shown in FIG. 7A through FIG. 10 could also be implemented for wheels that use disk brakes. One simple way of adapting these embodiments to using disk brakes would be use a disk brake rotor adapter configured for attachable detachment to the bicycle wheel hub. This disk brake rotor adapter could be configured for attachment of a disk brake rotor at the correct location on the bicycle wheel to match the standard placement of the disk brake rotor on the bicycle wheel. This bicycle wheel hub can be configured for detachable attachment to a structure comprising spokes in tension that connect to a bicycle wheel ring. Attachment and detachment of the disk brake rotor could be performed independently of the detachable attachment of the bicycle wheel hub from the structure comprising the spokes in tension.

More broadly, it should be noted that embodiments of the wheels in the present invention can comprise any combination or set of permutations of the elements and features illustrated and/or described in this document. These elements and features can further include, but are not limited to:

the use of any number of fasteners (such as lug nuts, lug bolts, and/or eccentric cam quick release devices) to attach an annular module to a hub module, not just the 3 shown in these embodiments;

using annulus-to-hub mounting tabs instead of or in addition to mounting blocks;

using a matching pair of conical features on interface between the single thick spider, 260 in FIG. 10 and the mounting block, 266 in FIG. 10, in addition to or instead of some of the other conical features shown in FIG. 10;

a configuration of the annulus in which straight spokes instead of j-bend spokes are used and therefore the inner attachment points of the spokes are through holes in a hollow cylinder located on two parallel planes that are perpendicular to the central axis of the wheel;

the hub axle (and therefore the hub module and entire wheel) could be configured to attach the bicycle frame at only one point (i.e. on only one side) such as a front hub that is configured to attach to a fork similar to the "Lefty" fork made by Cannondale; and/or a wheel configuration that has no central hub. Instead, there could be a ring-shaped inner annulus (to which the spokes are attached) that further comprises one or more bearings that have a large central opening. One race of this bearing or bearings could be attached to the annulus. The other race could be attached to a ring-shaped element that does not rotate when the wheel rotates and this ring-shaped element could be attached to one arm of a front "fork" that then attaches to the rest of the bike frame in a way that is very similar to the "Lefty" fork made by Cannondale. Thus, the wheel and fork would always have a large diameter aperture that allows a real wheel to nest inside of the center of a front wheel.

6. Rigid Folding Joint Between Front and Rear Frame Sections

Structural rigidity (also known as stiffness) and strength are technical challenges in designing and fabricating lightweight bicycle frames. The challenges are even greater for folding frames than for non-folding frames. The region of the bicycle frame proximate to the pedals and cranks is one of the most critical for bicycle frame stiffness as there are many loads that come together in this region to cause the frame to flex and twist in a complex 3-dimensional fashion. This challenge is compounded in folding frames of the type described in this document because the folding connection between the front frame section and the rear frame section occurs in the highly loaded region proximate to the pedals and cranks. Two of the most functionally critical and noticeable deflections on a bicycle frame can be:

(a) Twisting (torsion) of the bike frame. This will be discussed in greater detail in the paragraphs that follow.

(b) For bikes that use a toothed drive belt, deflection of the rear dropouts as a result of tension in the upper section of the toothed belt between the front sprocket (connected to the crank) and the rear sprocket (connected to the rear wheel) which can cause the toothed belt to skip. The configuration of the rear stays, chain stay, and other components of the rear dropouts that are shown and described in conjunction this document are critical to ensuring that there is sufficient rigidity to withstand these belt forces. A belt tensioner or other means for ensuring that there is no slack in the bottom section of the toothed belt is can also be important for ensuring that a belt drive system of this type performs as needed.

FIG. 11A, FIG. 11B, FIG. 11C, and FIG. 11D, provide a description of some of the forces on a bicycle frame that cause torsion and some of the structural elements, features, and configurations used in embodiments of the present invention to provide a torsionally stiff and lightweight folding bicycle frame. FIG. 11A shows a side view of the bicycle similar to the one shown in FIG. 1A with some of the main vertical forces that could be applied by a rider. FIG. 11A has been turned around from what was shown in FIG. 1A so it is oriented to match the orientation of the details that will be shown in FIG. 12A through 18B. FIG. 11B is a front view of the bicycle of FIG. 11A showing the same vertical forces. From physics, we know that forces that are aligned in one axis cancel each other out (principle of transmissibility) and forces that are opposite to one another but offset by a perpendicular distance create a moment equal the applied forces multiplied by the perpendicular distance between them. A moment that occurs in a first plane that is resisted by an equal and opposite moment in second plane parallel to the first plane creates torsion, a twisting force, in the structural elements between the first plane and the second plane.

In FIG. 11A, $F_W$ represents the weight of the bike rider when seated. This is resisted by $F_{FW}$, the reaction force upwards on the front wheel, and $F_{RW}$, the reaction force upwards on the rear wheel. As shown in FIG. 11B, these three forces are in the same plane (the vertical plane of the bicycle wheels when going straight), and therefore create no torsion. If the rider is pedaling, there will be a force $F_P$ applied to the pedals and this force $F_P$ is not aligned with the central plane of the bicycle. In the worst case, the rider is standing and the entire weight of the bike rider is applied as $F_P$ on the right pedal of the bicycle (and $F_W$ will be zero). FIG. 11B, shows that $F_P$ is not aligned in the same plane as $F_{FW}$ and $F_{RW}$ and this creates a moment, which will be shown at $M_{PW}$ (moment between pedal and wheels) in FIG. 11C and FIG. 11D. To balance $M_{PW}$, the rider who is standing on the pedals pushes up on one side of the handlebars and down on the other side of the handlebars as shown at $F_{HU}$ and $F_{HD}$ (handlebar up and handlebar down), which creates the moment shown as $M_{Handlebars}$ in FIG. 11C and FIG. 11D. Because $M_{PW}$ is not in the same plane as $M_{Handlebars}$, the front tube, 306 in FIG. 11A, and connection module, 408 in FIG. 11A, (also called the alternate hinge module) between the front frame section and rear frame section are subjected to a twisting (torsion) force which can noticeably distort the shape of the bicycle frame and create other issues (breakage, squeaking, etc.).

Referring in more detail to FIG. 11C, which is section i-i of FIG. 11A looking forwards, the clockwise twisting force from the pedals to the wheels $M_{PW}$ is resisted by a counterclockwise twisting force on the handlebars $M_{Handlebars}$, and this twisting force (torsion) is transmitted through the front tube 306, causing the front tube to twist about its central axis, the point shown at the intersection of line segment x-x and line segment y-y. For a hollow cylindrical tube such as the front tube, the torsional stiffness (rate of twist) per unit of length of the tube can be calculated using the following equations:

$$K/L=(E)(J)$$

$$J=\pi(D^4-d^4)/32$$

$$t=(D-d)/2$$

Where:
K/L=rate of twist of the tube (K) per unit of length (L)
E=modulus of elasticity of the tube material
J=polar moment of inertia for the cross section
D=outside diameter of the cylindrical tube
d=inside diameter of the cylindrical tube
t=wall thickness for the cylindrical tube Based on the above equations, there are four primary ways to increase torsional stiffness of the front tube 306, and therefore make the bike frame stiffer and more resistant to twisting forces:

(a) Shorten the front tube;

(b) Increase the outside diameter;

(c) Increase the wall thickness (or decrease "d" while keeping "D" the same); and/or (d) Use a stiffer tube material. Steel is 2× stiffer than titanium, but also 2× heavier. Steel is 3× stiffer than aluminum, but also 3× heavier.

Given that the front tube cannot be shortened and the material has been chosen for other reasons, the main parameters that can be changed are tube diameter (D) and wall thickness (t). However, increasing wall thickness increases the weight of the tube. For these reasons, the front tube should be as large in diameter as is feasible within other constraints. More specifically, from this discussion and equations presented, it should be clear that doubling the height of something in the direction that opposes a torsional load results in a 16× improvement in stiffness. However, it also results in a 4× increase in weight and mass. Doubling the outside diameter and halving the wall thickness, gives a 4× improvement in stiffness with no increase in weight. The same principles can be applied to cross sections that are not circular, don't have the same wall thickness all the way around and have walls that may not be solid at all points along the length of the structure that must transmit torsion. These principles can be summarized as follows:

(a) Increasing the outside dimensions (the equivalent of "D" in the equations above) has an enormous beneficial effect on torsional stiffness. This should be the first priority in optimizing the structure.

(b) Increasing the wall thickness of any part of the structure increases torsional stiffness.

(c) Holes in the walls of any part of the structure (i.e. regions with zero thickness) results in a significant reduction in stiffness for the structure.

Figures 12A, 12B:
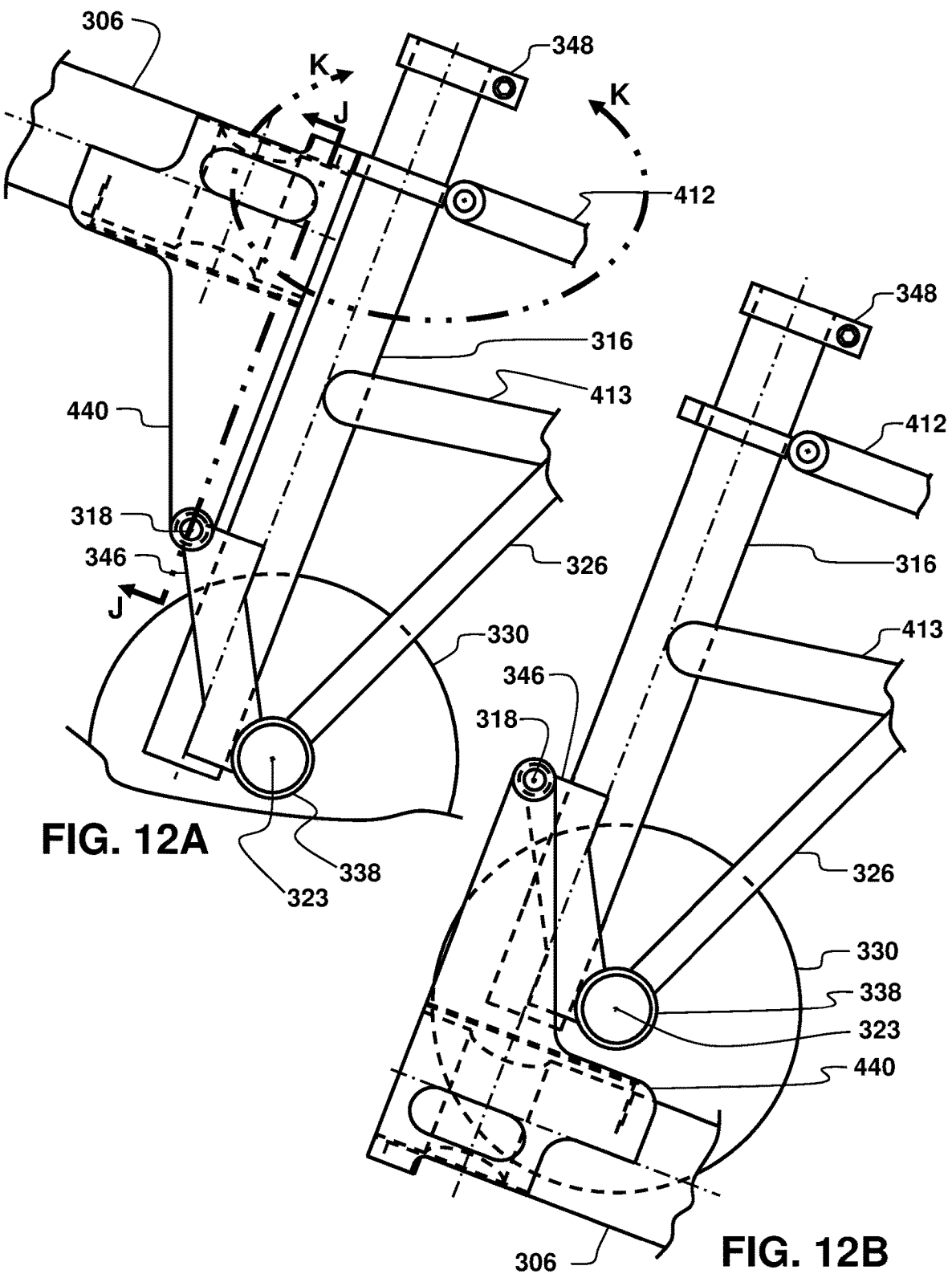
FIG. 12A shows a side view of a part of the frame similar to the frame of FIG. 1B when the hinge is in a ride configuration.
FIG. 12B shows a side view of the part of the frame of FIG. 12A in a folded configuration.
Figures 13A, 13B:
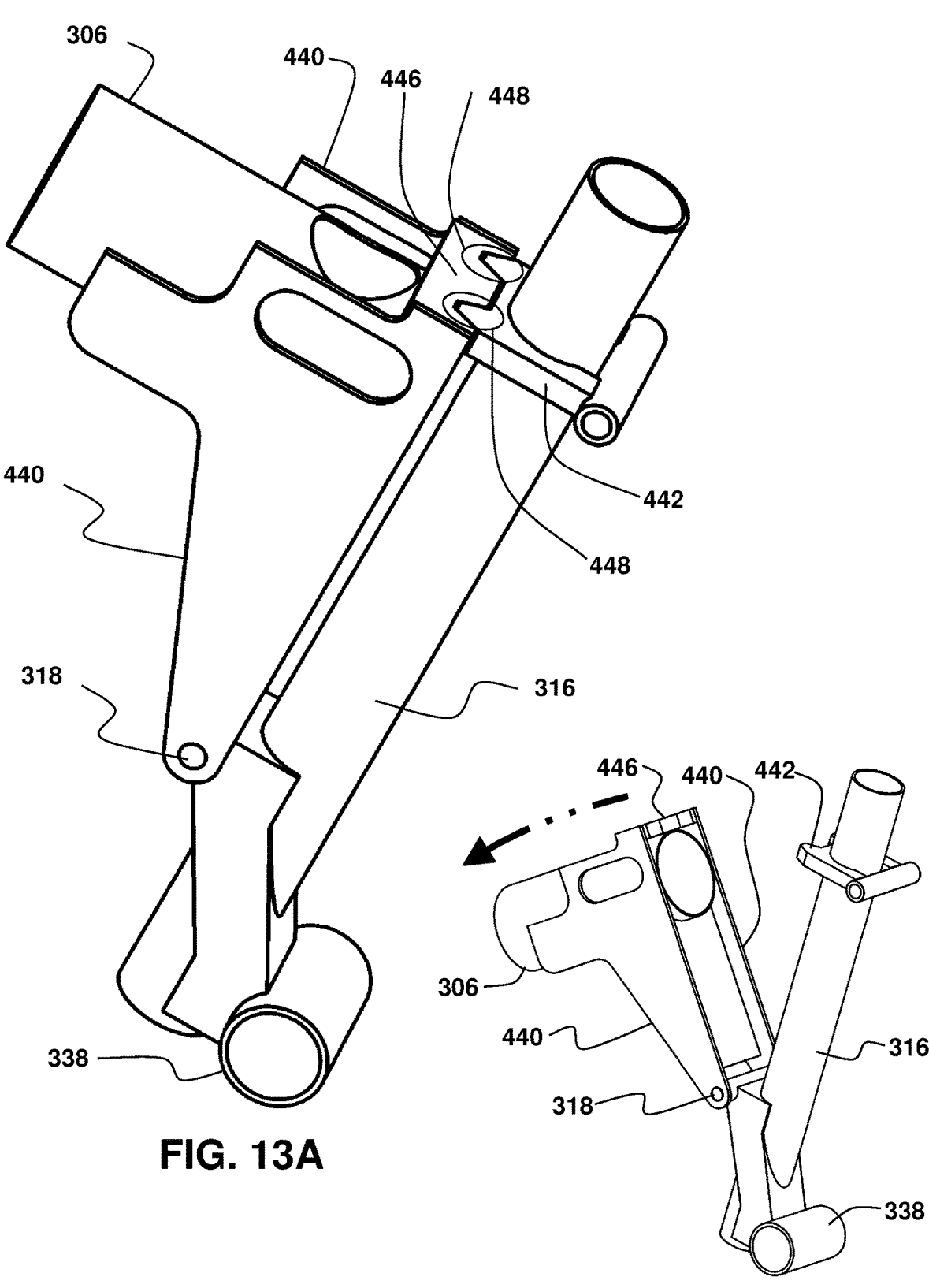
FIG. 13A shows a perspective view of some of the main elements of the hinge shown in FIG. 12A.
FIG. 13B shows the hinge of FIG. 12A when the front section has been rotated approximately 30 degrees clockwise.

Based on these principles for optimizing torsional stiffness, the best ways to increase the torsional stiffness of a bicycle frame is to increase the enclosed cross-sectional area and height and width of various elements of the system, especially those that are most flexible, regardless of whether those cross-sections are round or any other shape. FIG. 11D illustrates some of the things that have been incorporated to make the bicycle frame as stiff and lightweight as possible. FIG. 11D is an angled forward-looking section view of the connection module 408 at the interface between the front section and rear section of hinge module. Since the view in FIG. 11D is angled differently than section i-i of FIG. 11C, only the end section of the front tube 306 is visible. Specifically, FIG. 11D shows section J-J in FIG. 12A. This will also be illustrated in various top views of clamping embodiments. Referring to FIG. 11D, the same clockwise torsional load created by $M_{PW}$ (twist of the pedals relative to the wheels) which must is resisted by a counterclockwise twisting force on the handlebars $M_{Handlebars}$, must be transmitted through the connection module 408. More specifically, torsional (twisting) forces are transmitted in the connection module 408 between the front frame section (such as 601 in FIG. 1B) and the rear frame section (such as 402 in FIG. 1B through two interfaces:

(a) The interface between the front frame clamp block (front jaw), shown at 446 in FIG. 11D and the rear frame clamp block (rear jaw), shown at 442 in FIG. 13A and FIG. 13B; and (b) The folding frame pivot axis or hinge shown at 318 in FIG. 12A through 13B.

The items that can be incorporated to make the interface between the front frame clamp block (front jaw) 446 and rear frame clamp block (rear jaw) 442 stiff, and therefore resistant to torsional forces, can include:

(a) Making the front frame clamp block 446 as thick (vertical dimension) as possible. In one embodiment the front frame clamp block 446 is more than 2× thicker than the wall thickness of the front tube 306. The front frame clamp block 446 could be made more than 3×, more than 4×, or more than 5× thicker than the wall thickness of the front tube.

(b) Making the front frame clamp block 446 at least as wide (horizontal dimension) as the outer diameter of the front tube 306. In one embodiment, the front frame clamp block 446 is rectangular and has a width is at least 2×, at least 3×, and/or at least 4× its thickness. Similarly, from the drawings that show the front clamp block 446 and the rear clamp block 442, it is possible to see that the rear clamp block is also rectangular and also has a similar ratio between its width (horizontal dimension when looked at in a ridable orientation) and thickness (vertical dimension when looked in a ridable orientation). This ratio of width to thickness best matches the function of the clamp blocks (clamp jaws) to act as part of the structure that resists torsional (twisting) loads on the bicycle frame.

(c) Providing one or more vertically-oriented v-shaped features in the interface between the front jaw 446 and rear jaw 442, as can most clearly be seen at 448 in FIG. 13A. These v-shaped features have the shape of the letter "V" with flat bottoms. The pair of angled side surfaces of the v-shaped features resist lateral movement (i.e. horizontal movement perpendicular to the direction of engagement between the front jaw and rear jaw) when the front and rear jaws are pressed together. This lateral movement that is prevented can also be described as being movement parallel to the axis of rotation of the front frame section relative to the rear frame section (which is also parallel to the axis of rotation of the crankshaft and the axis of rotation of the rear wheel). The v-shaped features can also be seen from various perspectives as part of the front jaw 446 and rear jaw 442 in FIG. 13B. When looking at these drawings, it is also noteworthy that the front jaw 446 and rear jaw 442 comprise rectangular blocks having a width at least 2×, 3×, 4×, or 5× their thickness.

The items that can be incorporated to make the folding frame pivot axis (or hinge, or pivot shaft) 318 region stiff, and therefore resistant to torsional forces, can include:

(a) Making the pivot shaft housing 347, shown in FIG. 11D, and associated pivot shaft bracket(s), shown at 346 in FIG. 12A and FIG. 12B, as large and therefore stiff as possible. In the embodiment shown, the pivot shaft housing 347 has a wall thickness at least the same as the wall thickness of the front tube 306. The wall thickness of the pivot shaft housing 347 could also be more than 2×, 3×, or 4×the wall thickness of the front tube 306 if additional stiffness is desired.

(b) Using a pivot shaft 318 that has as large as possible of a diameter. In the embodiment shown, the pivot shaft 318 has a diameter at least that of the wall thickness of the front tube 306. The diameter of the pivot shaft 318 could also be more than 2×, 3×, or 4× the wall thickness of the front tube 306 if additional stiffness is desired.

(c) Providing a tight fit between the pivot shaft 318 and the pivot shaft housing 347.

(d) Providing a tight fit between the pivot shaft 318 and the front tube brackets 440.

(e) Making the distance from the central axis of the pivot shaft 318 to the central axis of the front tube 306, as shown at the intersection of the x-x and y-y lines as great as possible to provide the maximum leverage.

The items that can be incorporated to make the connection between the pivot axis (or hinge, or pivot shaft) 318 region and front tube 306 stiff, and therefore resistant to torsional forces, can include:

(a) Making the thickness (horizontal dimension) of the front frame brackets 440 as great as possible. In the embodiment shown in FIG. 11D the front frame brackets are at least 1.5 thicker than the thickness of the front tube 306 walls. For greater stiffness, the front frame brackets could be more than 2×, 3×, 4×, or 5× the thickness of the front tube 306 walls.

(b) Making the width of the front frame brackets 440 (approximately horizontal dimension of the front frame brackets 440 as shown in FIG. 12A) as great as possible. As shown in FIG. 12A, the front frame brackets 440 are tapered to be narrower that their bottoms and wider in the region where they connect to the front tube 306. As can be seen in FIG. 12A, the front frame brackets 440 are wider than the diameter of the front tube 306 in the region where the front frame brackets 440 attach to the front tube. If even greater stiffness is desired, the front frame brackets could be more than 2×, more than 3×, or more than 4× wider than the front tube 306 diameter in this region.

The items that can be incorporated to make the connection between the front frame clamp block (front jaw) 446 and front tube 306 stiff, and therefore resistant to torsional forces, can include:

(a) Having the vertical engagement surface between the front jaw 446 and front frame brackets 440 be as large as possible.

(b) Providing a direct attachment point between the front jaw 446 and the front tube 306 as shown at the point of the top tube 306 that touches the front jaw in FIG. 11D.

Applying these principles for optimizing stiffness and the features described above, the hinge and clamp designs in the illustrated in FIG. 12A through FIG. 18B are specifically designed to maximize stiffness for a given amount of a material. The configuration illustrated in these drawings also simplifies manufacturability and the ease (and therefore speed) for a user to fold and unfold a bicycle frame of the type described in this document.

FIG. 12A shows a horizontally flipped side view of a part of the frame of FIG. 1B when the hinge module is in a ride configuration. FIG. 12B shows the same components as FIG. 12A when the alternate hinge is in a folded configuration. The following rear frame components are shown in the same locations in FIG. 12A and FIG. 12B:

(a) the bottom bracket housing, which can more generically be referred to as a human power input device housing, 338;

(b) the front chain ring 330;

(c) the rear stay stiffeners 326;

(d) the upper rear stays 412;

(e) the lower rear stays 413;

(f) the main seat tube 316;

(g) the lower pivot adapter brackets 346 that rigidly, fixedly, and permanently connect the lower pivot element 318 to the main seat tube 316 and human power input device housing (bottom bracket housing) 338; and (h) the main seat tube clamp 348 that clamps the telescoping seat tube, 336 in FIG. 1B, or the seat post 334, into the seat tube 316.

In FIG. 12A the front frame section is in "ride" mode. This means that the rear frame components (i.e. rear frame section) described previously are clamped to the front frame components (front frame section) in region K-K of FIG. 12A. The front frame components visible in FIG. 12A and FIG. 12B comprise a front frame tube 306 and a front frame tube bracket 440. In FIG. 12B, the folding frame is in "packed mode" with the front frame section rotated (counterclockwise in this view) by approximately 180 degrees around the folding frame pivot axis 318 from the "ride mode" configuration that was shown in FIG. 12A. In FIG. 12A and FIG. 12B the folding frame pivot axis 318 is located above and forward of the bottom bracket shell 338, and more generally speaking the folding frame pivot axis 318 is located above and forward of the point of rotation of the cranks (crank rotation point shown at 323 in FIG. 12A and FIG. 12B) when the rear of the bicycle if viewed in its normal upright orientation.

FIG. 13A shows a perspective view of elements of the hinge module shown in FIG. 12A. Like in FIG. 12A, the hinge module (or connection module) is in a ride configuration. For clarity, the chain stays, lower seat stays, upper seat stays, and front chain ring, and main seat tube clamp that were shown in FIG. 12A are not shown with the hinge/connection module in FIG. 13A. FIG. 13B shows the hinge module of FIG. 13A when the front section has been rotated approximately 30 degrees clockwise. Referring to FIG. 13A and FIG. 13B, the folding frame pivot axis (or hinge section of the connection module) is shown at 318. The folding frame pivot axis 318 connects the front frame section to the rear frame section and allows the front frame section to rotate about a horizontal axis approximately 180 degrees to convert the bicycle frame from a rideable configuration to a folded configuration. A section of the front tube is shown at 306. Two sides of the front frame tube bracket are shown at 440. The front frame tube bracket 440 rigidly, fixedly, and permanently connects the folding frame pivot axis 318 (also known as a front frame pivot element, pivot, or hinge), the front frame tube 306, and the front frame clamp block 446 (also referred to as a front clamp element, a front frame jaw, a front clamp jaw, or a front jaw). The key elements of the rear frame, which are rigidly, fixedly, and permanently connected to the folding frame pivot axis 318 and to each other include the bottom bracket housing 338 (configured to hold the axis of rotation of the cranks), the seat tube 316, the rear frame clamp block 442 (also referred to as a rear clamp element, a rear frame jaw, a rear clamp jaw, or a rear jaw), and the rear frame pivot housing 444. In the embodiment shown in FIG. 13A and FIG. 13B the crankshaft housing 338 comprises a cylindrical bottom bracket housing configured for holding a crankshaft and bearings. In this configuration, the bearings rotationally couple the crankshaft (which can also be called an axle or spindle) to the cylindrical bottom bracket housing.

7. Clamping the Front Frame Section and Rear Frame Section Together

It should be noted that in normal riding use, the weight of the rider (Fw in FIG. 11A) will cause the rear frame clamp block 442 to press against the front frame clamp block 446 and if these two components are properly designed, no clamp is necessary to provide resistance against bending and torsion between the front frame section and the rear frame section. However, the front frame section would rotate relative to the rear frame section if the center of the bicycle were lifted and there was nothing holding the two frame clamp blocks, 442 and 446, together. Thus, at least some minimal clamping force between the rear frame clamp block 442 and the front frame block 446 is needed for cyclists to have a normal experience the folding system described herein. Such clamping force could be provided by devices as simple as a strap that connects the front frame section to the rear frame section in the region proximate to the rear frame clamp block 442 and the front frame clamp block 446.

Figure 14A:
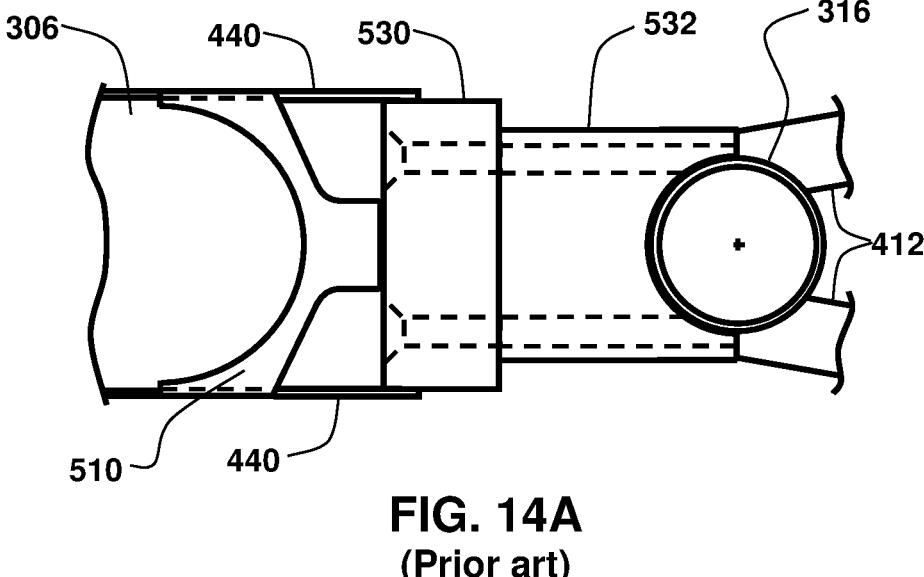
FIG. 14A shows a top view for a clamp module that uses two clamp bolts, and is an alternate embodiment of the clam module of FIG. 12A, FIG. 12B, FIG. 13A, and FIG. 13B.
Figure 14B:
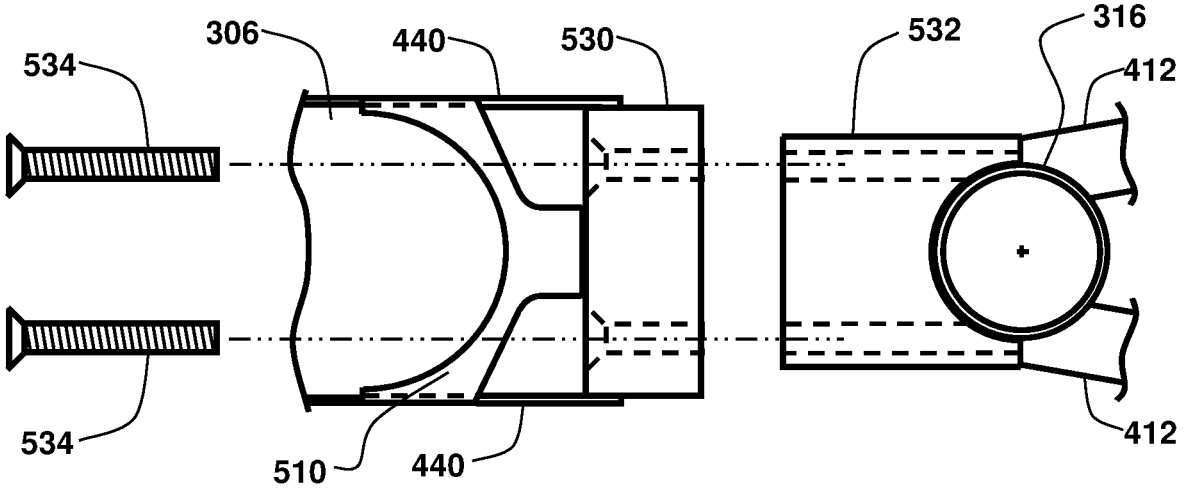
FIG. 14B is an exploded top view of the components shown in FIG. 14A.

FIG. 14A and FIG. 14B illustrate a system for clamping the front frame section to the rear frame section using bolts. In this case, no vertically oriented v-shaped features of the type shown at 448 in FIG. 13A or FIG. 13B may be needed. Referring in detail to FIG. 14A and FIG. 14B, the front tube is shown at 306, the front frame tube brackets are shown at 440, the seat tube is shown at 316, and the upper rear stays (or upper seat stays) are shown at 412. These elements were also shown in other embodiments of the clamping system. In this embodiment, an alternate embodiment rear frame clamp base 532 is fixedly attached to the seat tube 316 and upper rear stays 412. An alternate embodiment front clamp base 530 is fixedly attached to the front tube 306 and front frame tube brackets 440. There is also a front frame clamp base bracket 510 that fixedly connects the front tube 306, front frame tube brackets 440, and the alternate embodiment front clamp base 530. The alternate embodiment front and rear clamp bases 530 and 532 have threaded holes into which two frame clamp bolts 534 can be threaded and tightened to provide for a very simple system for clamping the front frame section to the rear frame section of a folding bike of the type described herein.

Figure 15A:
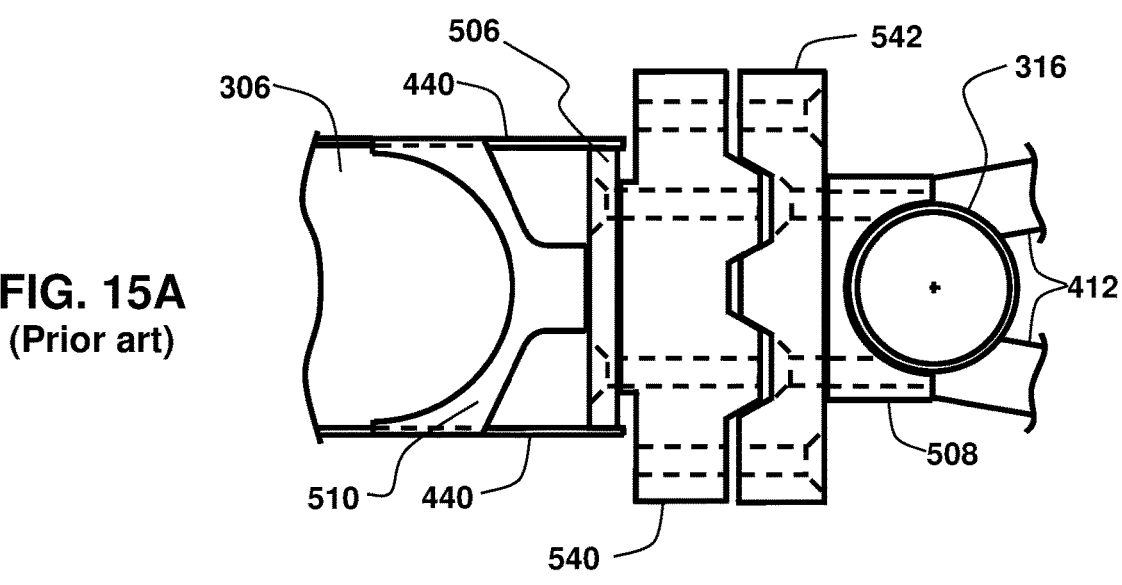
FIG. 15A shows a top view for an alternative clamp module that uses replaceable clamp blocks and two clamp bolts.
Figure 15B:
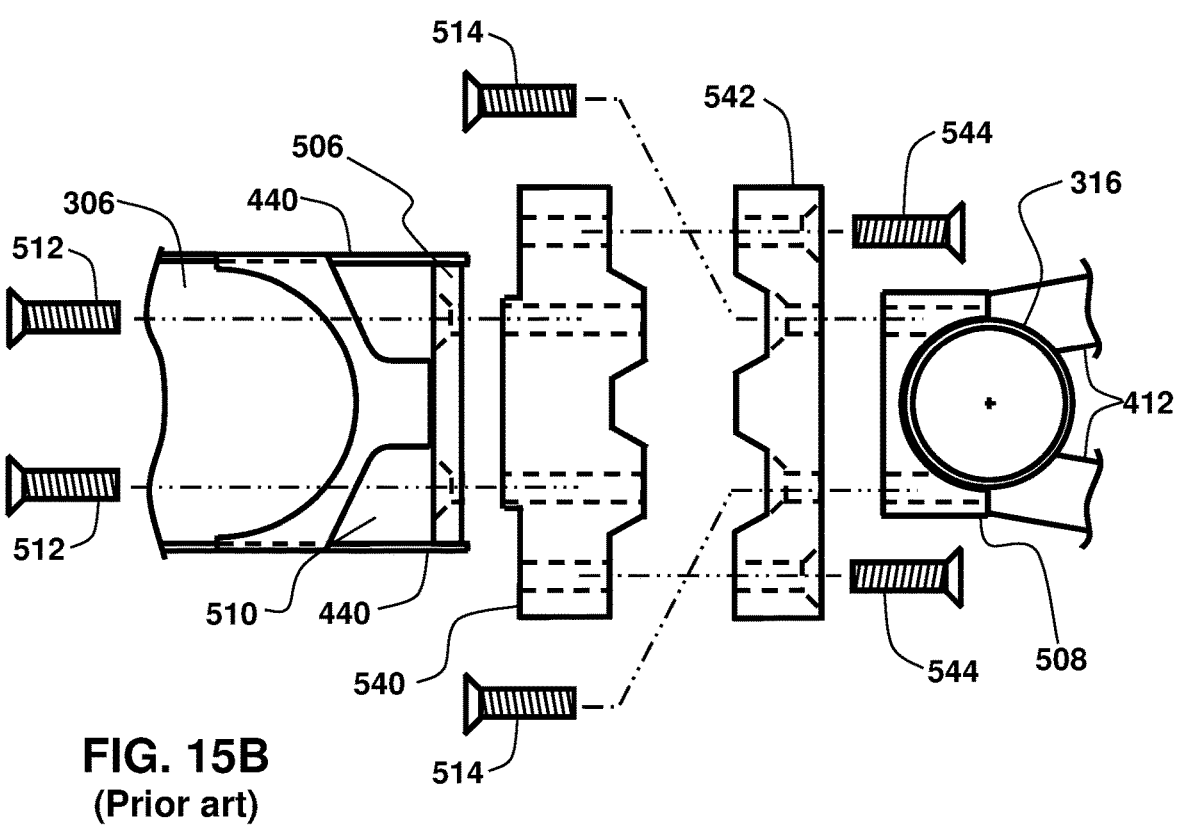
FIG. 15B is an exploded top view of the components shown in FIG. 15A.

It should be noted that the concept of replaceable front and/or rear clamp blocks can be combined with the concept of the frame clamp bolts, shown at 534 in FIG. 14A and FIG. 14B, that are used to detachably attach and detach the front frame section to the rear frame section. Such as system is illustrated in FIG. 15A and FIG. 15B. FIG. 15A and FIG. 15B, also show a front frame tube 306, front frame tube brackets 440, front frame clamp base 506, front frame clamp base bracket, front frame clamp bolts, upper rear stays 412, seat tube 316, rear frame clamp base 508, and rear frame clamp block bolts 514. There is a replaceable rear frame clamp block that has a clamp bolt hole, and is shown at 542 in FIG. 15A and FIG. 15B. There is a replaceable front frame clamp block that has a clamp bolt hole, and is shown at 540 in FIG. 15A and FIG. 15B. In the embodiment shown in FIG. 15A and FIG. 15B, alternate frame bolts shown at 544 serve the function of rigidly attaching the front frame section to the rear frame section when the bike is in "ride mode". It should also be noted that the replaceable front and/or rear clamp blocks in such a system could be implemented either with or without the vertically-oriented v-shaped features of the type shown at 448 in FIG. 13.

Figure 16A:
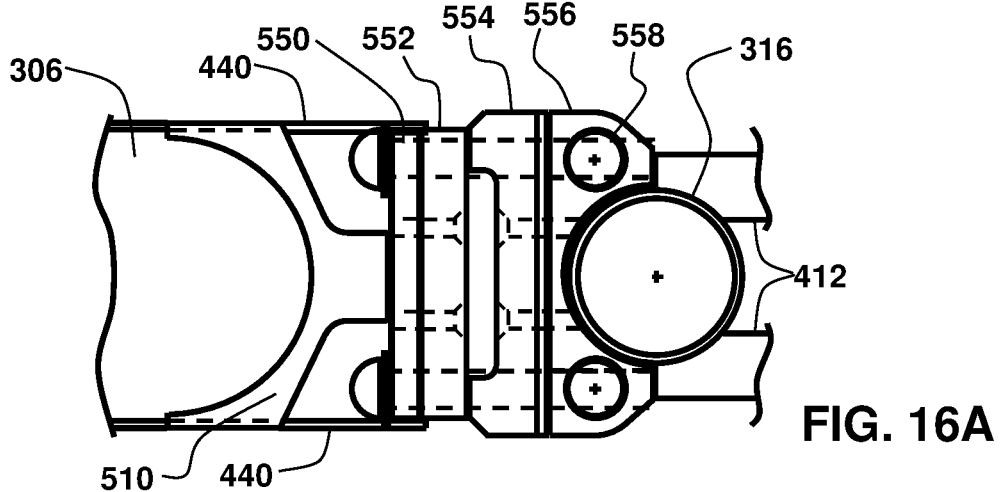
FIG. 16A shows a top view for another clamp module that uses barrel nuts to facilitate clamping and unclamping of the frame.
Figure 16B:
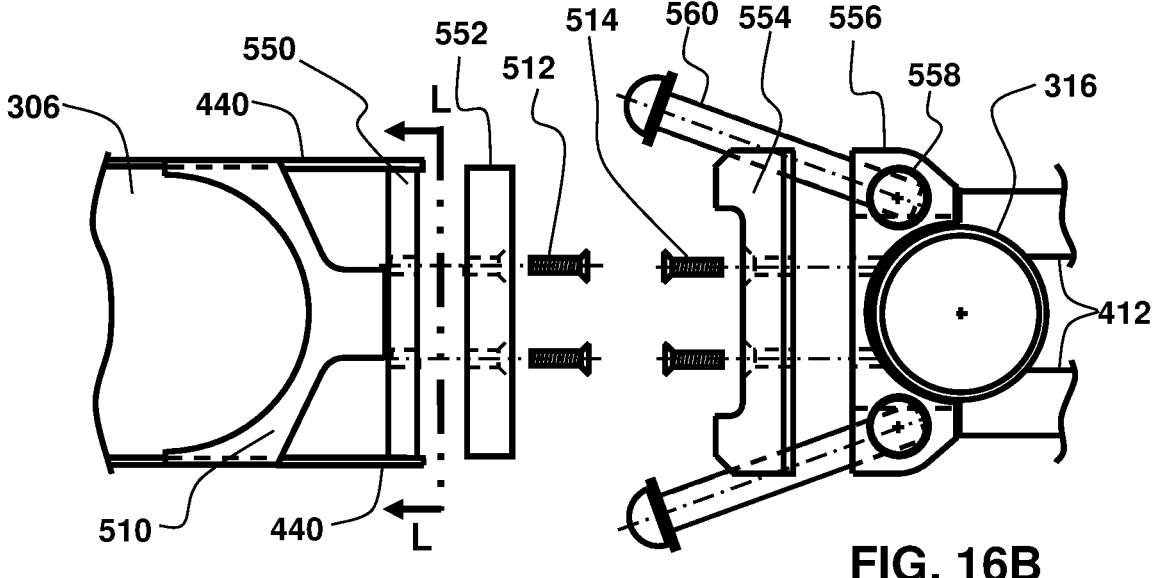
FIG. 16B is an exploded top view of the components shown in FIG. 16A.
Figure 16C:
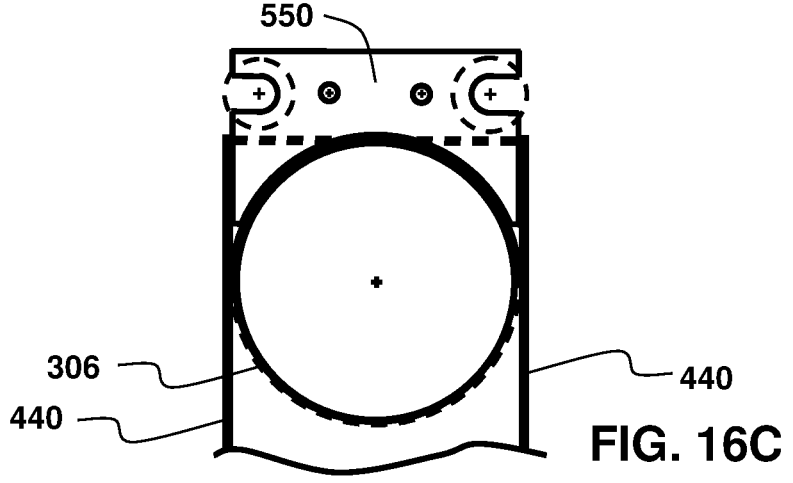
FIG. 16C provides view L-L to illustrate the slots in the front frame section into which the clamp bolts of the system of FIG. 16A and FIG. 16B are rotated.

FIG. 16A, FIG. 16B, and FIG. 16C show a clamping system that is improved from the system shown in FIG. 14A, FIG. 14B, FIG. 15A, and FIG. 15B. This barrel nut clamping system shown in FIG. 16A, FIG. 16B, and FIG. 16C uses barrel nuts and bolts to provide a clamping system that is easier and faster to clamp and unclamp. The barrel nut clamping system is also more tolerant to alignment issues between the front frame section and rear frame section of the bicycles using a frame folding technique shown in this document. FIG. 16A shows a top view of this barrel-nut-based system. FIG. 16B is an exploded top view of the components shown in FIG. 16A. FIG. 16C provides view L-L to illustrate the slots in the front frame front frame base block 550 into which the barrel nut engagement shown in FIG. 16A and FIG. 16B are rotated. Referring to this barrel-nut based clamping system, the following components are the similar and serve similar functions as what has been shown and describe previously in this document: the front tube 306, the seat tube 316, and the upper rear stays 412. the front frame tube brackets 440, the front frame clamp block bolts 512, and the rear frame clamp block bolts 514.

As shown in FIG. 16A and FIG. 16B the barrel nut clamping system uses barrel nuts 558 that can rotate in a barrel nut rear clamp base 556 to allow barrel nut engagement bolts 560 to clamp the front frame section to a rear frame section when the front frame section and rear frame section are pressed together as shown in FIG. 16A and to release the front frame section from the rear frame section when the barrel nut engagement bolts 560 are loosened sufficiently to be rotated out of slots in the slotted front clamp base 550, slots in the slotted front clamp block 552, and slots in the slotted rear clamp block 554.

FIG. 16C most clearly shows what is meant by slots in the description of this embodiment of the clamping module by showing a view of the front clamp base 550 that has openings on the left and right side into which the shafts of the barrel nut engagement bolts 560 (that were shown most clearly in FIG. 16B) can be rotated.

Figure 17A:
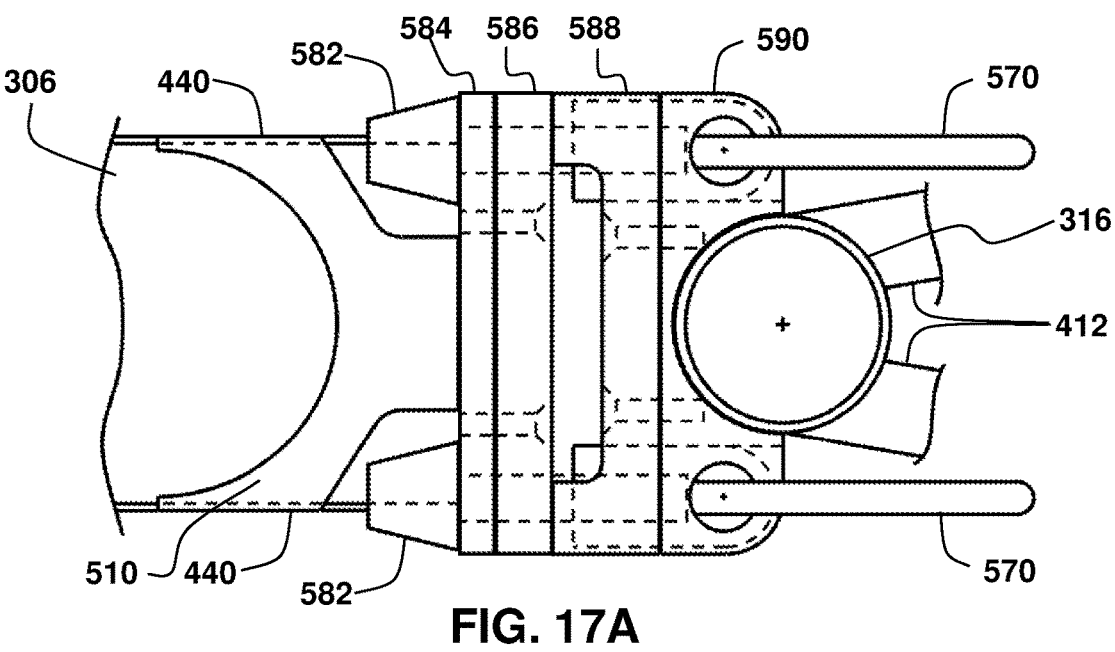
FIG. 17A shows a top view of a clamp module in which the barrel nuts of the module of FIG. 16A, FIG. 16B, and FIG. 16C have been replaced with a hand-tightenable eccentric shafts and shaft followers.
Figure 17B:
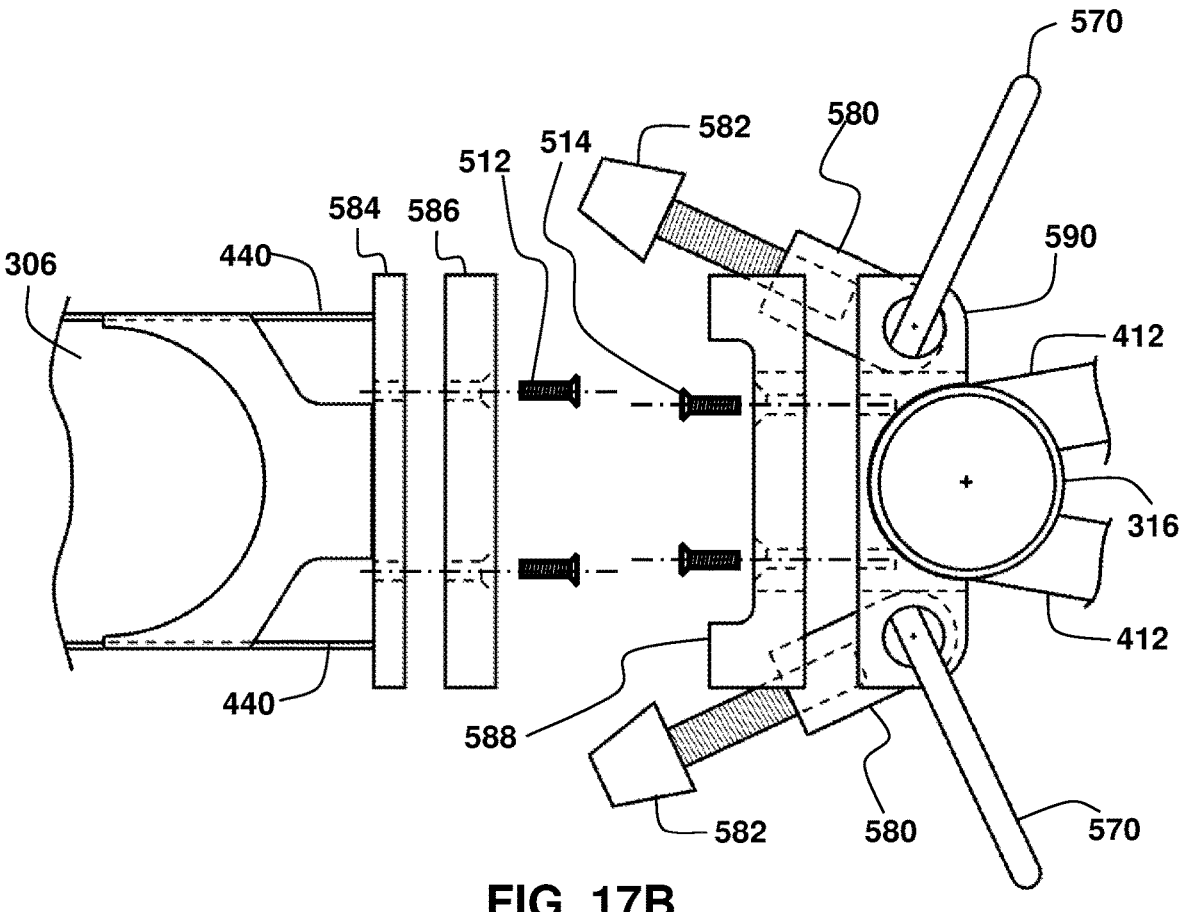
FIG. 17B is an exploded view of the components shown in FIG. 17A.

FIG. 17A and FIG. 17B show a top view of a clamp module that replaces the barrel nuts of the system of FIG. 16A, FIG. 16B, and FIG. 16C with hand-tightenable eccentric shafts 570 and eccentric shaft followers 580. This creates a clamping system that (a) is tolerant of manufacturing variations, (b) provides for a strong clamping force that ensure frame rigidity, and requires no tools to quickly and simply clamp and unclamp a front frame section and rear frame section of a folding bicycle. Referring to this hand-tightenable eccentric shaft clamping system, the following components are the similar and serve similar functions as what has been shown and described previously in this document: the front tube 306, the seat tube 316, and the upper rear stays 412. the front frame tube brackets 440, the front frame clamp block bolts 512, and the rear frame clamp block bolts 514. FIG. 17A and FIG. 17B also show an eccentric shaft slotted front clamp base 584, an eccentric shaft slotted front clamp block 586, and an eccentric shaft rear clamp block 588, all of which serve similar functions to similarly named components described with respect to the barrel nut clamping system described with reference to FIG. 16A, FIG. 16B, and FIG. 16C.

Figure 18A:
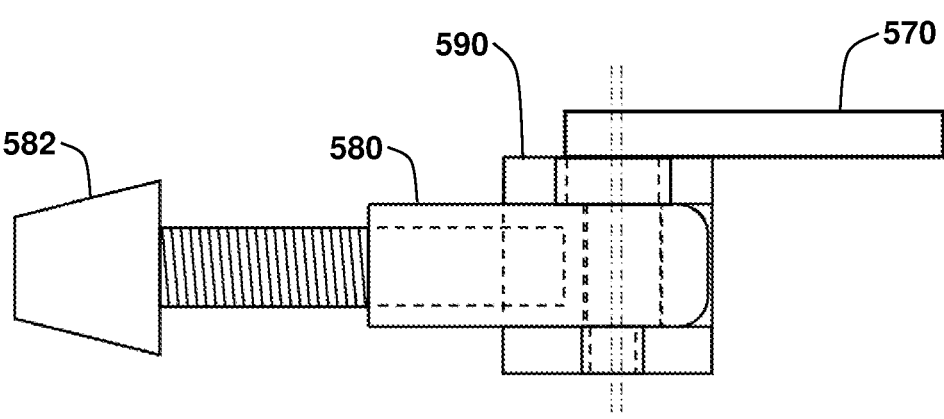
FIG. 18A shows a side view of the eccentric shaft with handle, housing, shaft follower, and thumb screw of the clamp module of FIG. 17A and FIG. 17B.

FIG. 18A is a side view of some of the components used to hand tighten the assembly shown in FIG. 17A and FIG. 17B. This layout illustrates the eccentric shafts 570, rear clamp block that houses the eccentric shafts 590. It also shows the eccentric shaft follower 580, and the thumb screw 582.

Figure 18B:
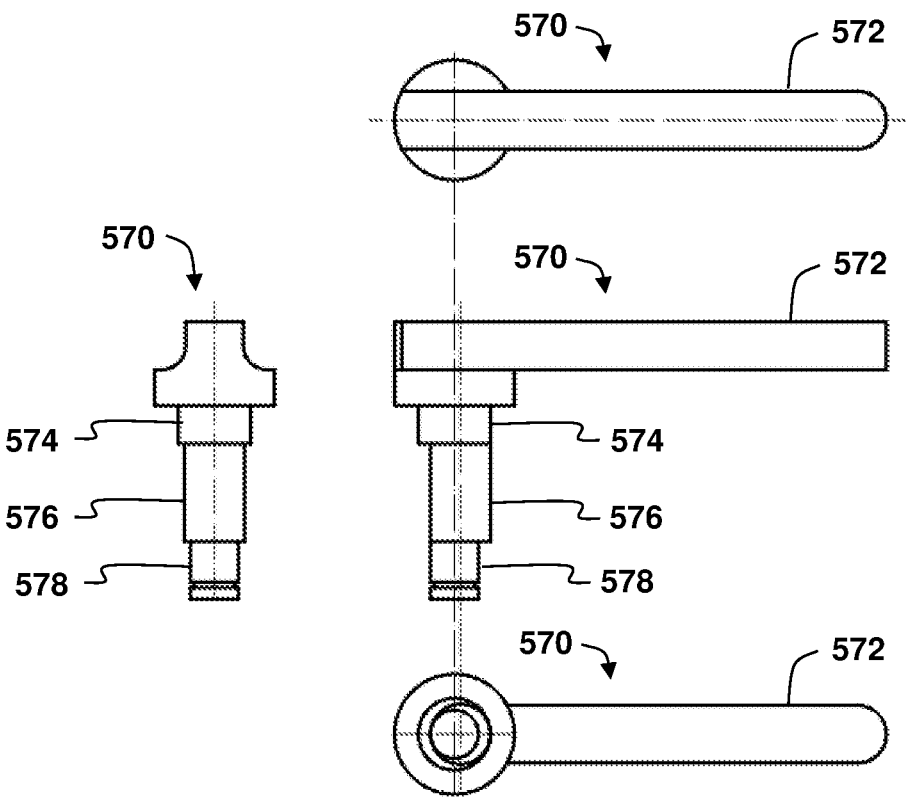
FIG. 18B provides orthogonal views of the hand tightenable eccentric shaft for the clamp module of FIG. 17A, FIG. 17B, and FIG. 18A.

FIG. 18B provides four orthogonal views of the hand-tightenable eccentric shaft 570 that can be used to hand-tighten the quick release mechanism in the module shown in FIG. 17A, FIG. 17B, and FIG. 18A. This eccentric shaft 570 performs the core functionality of the hand-tightenable eccentric shaft module. The hand-tightenable eccentric shaft 570 comprises a handle 572, a first shaft region 574, a second shaft region 576, and a third shaft region 578, and a handle 912, wherein:

the second shaft region 576 is located between the first shaft region 914 and the third shaft region 578;

the first shaft region 574 has a cylindrical shape with a central axis aligned with a first axis of rotation;

the third shaft region 578 comprises a cylindrical shape with a central axis aligned with the first axis of rotation;

the second shaft region 576:

is located between the first shaft region 574 and the third shaft region 578; and comprises a cylindrical shape with a central axis offset and parallel to the first axis of rotation to create an eccentric motion for any shaft follower 580 that surrounds the second shaft region when the eccentric shaft with handle 570 is rotated inside of a clamp housing 588 that is stationary.

Further describing this clamp module, the clamp housing 590 shown in FIG. 17A, FIG. 17B, FIG. 18A, and FIG. 18B, is (a) is attached to a seat tube (316 in FIG. 17A and FIG. 17B) and (b) is configured for retaining two hand-tightenable eccentric shafts 570 (in FIG. 17A, FIG. 17B, FIG. 18A, and FIG. 18B). Shaft followers 580 are retained inside the clamp housing 590. The clamp housing 590 is configured for rotational coupling with the first shaft region 574 and the third shaft region 578, of the eccentric shaft 570. The shaft follower 580 is configured for rotational coupling with the second shaft region 576 of the eccentric shaft 570. The handle 572 of the eccentric shaft 570 is configured for user rotation of the eccentric shaft 570. The clamp module is tightened to retain a front clamp section to a rear clamp section of a folding frame for a bicycle when the eccentric shaft 570 is rotated, by causing the shaft follower 580 to eccentrically move relative to the clamp housing 590, thereby providing high leverage for moving the shaft follower 580 to tighten something, such as a thumb screw or threaded rod with hand-tightenable nut 582. It should be noted that the thumb screw shown at 582 in FIG. 17A, FIG. 17B, and FIG. 18A can be any hand tightenable threaded fastener or combination of threaded fasteners capable of being understood by anyone skilled in the art, including fasteners such as wing nuts, knobs, or thumb nuts attached to threaded rods that go into the eccentric followers 580.

8. Additional Embodiments and Variations

Referring generally to all references made herein to nuts and bolts, these fasteners could also be so called "wing nuts" or "wing bolts" that comprise one or more ears that makes them hand tightenable. For example, the lug nuts shown at 274 in FIG. 8A through FIG. 9D could also be wing nuts that have a conical frustum feature. Similarly, any other nut or bolt shown in this document could also have "wing" features that allow them to be tightened and loosened without the use of tools, or any other features to make them easily turned by hand.

Referring generally to the embodiments shown in this document, it should be noted that that the front frame tube 306 does not need to be a circular tube. This tube 306 could also have an over, square, or rectangular tubular cross section, or any other cross section capable of being understood by anyone skilled in the art. In fact, the front frame structural element connecting the head tube 304 to the hinge module (comprising a pivot point 318 and clamp module 320 as shown in FIG. 2A) or front frame connection bracket (440 in FIG. 11D, FIG. 12A, FIG. 12B, FIG. 13A, and FIG. 13B) could be any structural element or elements that provides sufficient strength and stiffness including, but not limited to a space frame comprising a plurality of structural elements that are rigidly connected to each other in a configuration optimized for high strength, high stiffness, and low weight. This space frame could be made of tubular, flat, bent, and/or angled components, as well as components with special profiles, and/or any combination of any of these components.

Properly constructed, a packed human powerable vehicle assembly such as that shown in this disclosure could be covered with a bag and that bag could be a suitably sized and structured bicycle pannier or panniers, totally eliminating the need for a suitcase to be carried or disposed of when the bicycle modules are reconfigured to be a ridable bicycle. This is further facilitated by the fact that bicycle panniers often have rigid sidewalls to prevent the panniers from getting pushed into the bike wheel. These rigid sidewalls become excellent penetration protection for the cover of the compacted bicycle when the panniers are reconfigured to be part of a cover for a compacted bicycle.

In embodiments of the present invention, the frame can comprise any material capable of being understood by anyone skilled in the art. Examples of frame materials can include carbon steel (which comprises iron, carbon, etc and may include molybdenum and vanadium), stainless steel (which comprises nickel, iron, etc), aluminum, magnesium, titanium, glass, cardboard, carbon fiber reinforced composite, glass fiber reinforced composite, wood, plastic, or boron fiber reinforced composite. Examples of frame manufacturing processes can include welding, brazing, soldering, autoclaving, machining, molding, casting, gluing, painting, anodizing; and vacuum forming.

As noted in FIG. 1A, the first wheel and the second wheel can have tires. The tires, 182 and/or 184 can be made using any material and process capable of being understood in the art. For example, one or more of the tires 182 and/or 184, can be made of rubber. One or more of the tires can have a protective layer of an aramid (Kevlar) to help reduce the possibility of punctures One or more of the tires 182 and/or 184, can comprise metal studs. One or more of the tires 182 and/or 184, can comprise an inflatable inner tube. Inflation of the inner tube can be performed using a presta valve or a schrader valve. One or more of the tires can be tubeless. The tires can be inflated when packed. The tires can be deflated when the vehicle (bicycle) is packed.

The various alternative elements, features, and configurations described in this document can be combined in any way capable of being understood by anyone skilled in the art. A number of additional variations and modifications of the disclosed embodiments can also be used. The principles described here can also be used for in applications other than bicycles or similar human-powered vehicles, such as motorcycles. While the principles of the disclosure have been described above in connection with specific apparatuses and methods, it is to be clearly understood that this description is made only by way of example and not as limitation on the scope of the disclosure.

What is claimed is:

1. A folding system for a bicycle comprising:
a front fork comprising:
a fork steerer configured for rotation inside of a head tube;
at least one fork blade configured for attaching a front wheel to the front fork; and
a fork crown that connects the fork steerer to each fork blade;
an auxiliary steerer, wherein:
the auxiliary steerer comprises a proximal end and a distal end;
the auxiliary steerer is non-collinear and at least approximately parallel to the fork steerer when the bicycle is in a rideable configuration;
the auxiliary steerer is in front of the fork steerer when the bicycle is in a rideable configuration;
the auxiliary steerer distal end is above the top of the head tube when the bicycle is in a rideable configuration;
the auxiliary steerer distal end is configured for attaching a handlebar;
a rotational coupling module wherein:
the rotational coupling module attaches the auxiliary steerer proximal end to the fork crown;
the rotational coupling module is configured to rotate the auxiliary steerer from a rideable configuration to a folded configuration; and
the rotational coupling module is configured for rotating the auxiliary steerer in a plane parallel with a plane of rotation of a rear wheel of the bicycle; and
a clamp module configured for:
rigid non-rotatable attachment to the fork steerer in a region above the top of the head tube to secure the fork steerer in the head tube; and
detachable attachment of the auxiliary steerer:
to rigidly attach the auxiliary steerer to the front fork when the bicycle is in a rideable configuration; and
to release the auxiliary steerer so that it can be rotated when the bicycle is converted to a folded configuration.

2. The folding system for a bicycle of claim 1 wherein:
the front fork comprises two fork blades wherein both fork blades:
are configured for attaching a front wheel to the front fork on one end; and
are connected to the fork crown on the other end;
the front fork is configured for using disk brakes;
the rotational coupling module is configured to rotate the auxiliary steerer about an axis of rotation that is perpendicular to an axis of rotation of the fork steerer in the head tube.

3. The folding system for a bicycle of claim 2 wherein:
the rotational coupling module comprises:
a hinge block configured for attachment to the fork crown;
a pivot pin configured for rotationally coupling the hinge block to a pivot shaft; and a pivot shaft configured for attachment to the auxiliary steerer.

4. The folding system for a bicycle of claim 3 wherein:
the front fork is configured to stay in the same plane as for a straight forward riding configuration and to fit inside a rear frame section when the bicycle is folded.

5. The folding system for a bicycle of claim 1 wherein:
the front fork comprises two fork blades wherein both fork blades:
  are configured for attaching a front wheel to the front fork on one end; and
  are connected to the fork crown on the other end.

6. The folding system for a bicycle of claim 1 wherein:
the front fork is configured for using disk brakes.

7. The folding system for a bicycle of claim 1 wherein:
the rotational coupling module is configured to rotate the auxiliary steerer about an axis of rotation that is perpendicular to an axis of rotation of the fork steerer in the head tube.

8. The folding system for a bicycle of claim 1 wherein:
the rotational coupling module comprises:
  a hinge block configured for attachment to the fork crown;
  a pivot pin configured for rotationally coupling the hinge block to a pivot shaft; and
  a pivot shaft configured for attachment to the auxiliary steerer.

9. The folding system for a bicycle of claim 1 wherein:
the folding system further comprises folding handlebars.

10. The folding system for a bicycle of claim 1 wherein:
the folding system further comprises at least one spoked wheel with disk brakes in which a central section can be removed using lug nuts.

11. The folding system for a bicycle of claim 1 wherein:
the folding system comprises a clamp between a front frame section and a rear frame section that uses barrel nuts.

12. The folding system for a bicycle of claim 1 wherein:
the folding system comprises a clamp between a front frame section and a rear frame section that uses an eccentric shaft and follower.

13. A bicycle folding system, wherein:
the system comprises a fork, a shaft, a coupling, and a clamp;
the fork comprises:
  a steerer configured for rotation inside of a head tube;
  at least one blade configured for attaching a wheel to the fork; and
  a crown that connects the steerer to the blade;
the shaft is located in front of and substantially parallel to the steerer when the bicycle is in a rideable configuration;
the coupling rotatably attaches one end of the shaft to the crown;
the coupling comprises:
  a block configured for attachment to the crown;
  a pivot shaft configured for attachment to the shaft; and
  a pin configured for rotationally coupling the block to the pivot shaft;
the other end of the shaft is configured for attaching a handlebar;
the clamp secures the steerer in the head tube in a region above the head tube; and
the clamp detachably attaches to the shaft:

to rigidly attach the shaft to the fork when the bicycle is in a rideable configuration; and
  to release the shaft so that it can be rotated when converting the bicycle to a folded configuration.

14. The system of claim 13 wherein:
the shaft is non-collinear with the steerer when the bicycle is in a rideable configuration;
the fork comprises two blades configured for attaching a front wheel;
the fork comprises disk brake calipers;
the front wheel comprises a disk brake rotor; and
the coupling is configured to rotate the shaft about an axis of rotation that is perpendicular to the axis of rotation of the steerer in the head tube.

15. The system of claim 13 wherein:
the fork is configured to stay in the same plane as for a straight forward riding configuration and to fit inside a rear frame section when the bicycle is folded.

16. The system of claim 13 wherein:
the coupling is configured to rotate the shaft about an axis of rotation that is perpendicular to an axis of rotation of the steerer in the head tube.

17. The bicycle folding system of claim 13 wherein:
the bicycle folding system is configured for folding a bicycle frame that has its front and rear wheels removed.

18. The bicycle folding system of claim 13 wherein:
the bicycle folding system is configured for folding a bicycle with wheels having a nominal outside tire diameter of at least 26 inches into the folded configuration that can fit into a rectangular prism having a total length plus width plus height of no more than 62 inches.

19. The bicycle folding system of claim 13 wherein:
the coupling is configured for rotating the shaft in a plane parallel with a plane of rotation of a rear wheel of the bicycle.

20. A method for folding a bicycle comprising the steps of:
establishing a fork that comprises:
  a steerer configured for rotation inside of a head tube;
  at least one blade configured for attaching a wheel to the fork; and
  a crown that connects the steerer to the blade;
using a coupling to rotatably attach one end of a an auxiliary steerer to the crown; wherein:
  the auxiliary steerer is non-collinear and at least approximately parallel to the steerer when the bicycle is in a rideable configuration;
  the auxiliary steerer is in front of the steerer when the bicycle is in a rideable configuration;
attaching a handlebar to the other end of the auxiliary steerer;
using a clamp above the head tube to:
  secure the steerer inside of the head tube;
  rigidly attach the auxiliary steerer to the fork when the bicycle is in a rideable configuration; and
  release the auxiliary steerer so that it can be rotated when converting the bicycle to a folded configuration; and
rotating the auxiliary steerer in a plane parallel to the plane of rotation of a rear wheel of the bicycle to convert the bicycle from the rideable configuration to the folded configuration.

* * * * *